United States Patent
Arora et al.

(10) Patent No.: US 11,451,394 B2
(45) Date of Patent: Sep. 20, 2022

(54) EFFICIENT HANDS FREE INTERACTION USING BIOMETRICS

(71) Applicant: Visa International Service Association, San Francisco, CA (US)

(72) Inventors: Sunpreet Singh Arora, San Mateo, CA (US); Kim Wagner, Sunnyvale, CA (US); John F. Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 237 days.

(21) Appl. No.: 16/637,398

(22) PCT Filed: Jul. 27, 2018

(86) PCT No.: PCT/US2018/044139
§ 371 (c)(1),
(2) Date: Feb. 7, 2020

(87) PCT Pub. No.: WO2019/055138
PCT Pub. Date: Mar. 21, 2019

(65) Prior Publication Data
US 2020/0186352 A1    Jun. 11, 2020

Related U.S. Application Data

(60) Provisional application No. 62/562,740, filed on Sep. 25, 2017, provisional application No. 62/559,406, filed on Sep. 15, 2017.

(51) Int. Cl.
*H04L 9/32*      (2006.01)
*G06F 21/32*     (2013.01)
(Continued)

(52) U.S. Cl.
CPC ............ *H04L 9/3231* (2013.01); *G06F 21/32* (2013.01); *G06V 40/10* (2022.01); *H04L 9/008* (2013.01);
(Continued)

(58) Field of Classification Search
CPC ................ G06F 21/32; G06K 9/00885; G06K 2009/00953; G06Q 20/3224;
(Continued)

(56) References Cited

U.S. PATENT DOCUMENTS 7,929,733 B1    4/2011    Lehnert et al.
2007/0011039 A1   1/2007    Oddo
(Continued)

FOREIGN PATENT DOCUMENTS

WO    WO-2016046652 A1 *   3/2016  ........... G06F 17/15
WO    2016109600          7/2016
(Continued)

OTHER PUBLICATIONS

PCT/US2018/044139 , "International Search Report and Written Opinion", dated Feb. 15, 2019, 12 pages.
(Continued)

*Primary Examiner* — Farid Homayounmehr
*Assistant Examiner* — Brian William Avery
(74) *Attorney, Agent, or Firm* — Kilpatrick Townsend & Stockton LLP

(57) ABSTRACT

Methods and systems for performing demographics filtering based on biometric information are disclosed. An access terminal can capture a biometric instance corresponding to a user, such as a fingerprint scan, iris scan, etc. The access terminal can determine demographics information from the biometric instance, such as the age, biological sex, or ethnicity of the user. The access terminal can compare the demographics information to demographics information
(Continued)

stored on a group of mobile devices corresponding to a group of users, in order to identify candidate user mobile devices. Once candidate user mobile devices are identified, the access terminal can perform a biometric match between the biometric instance corresponding to the user and biometric instances stored on the candidate user mobile devices. Once a biometric match and the corresponding mobile device are determined, the access terminal can conduct a further interaction with the mobile device.

24 Claims, 8 Drawing Sheets

(51) Int. Cl.
- *H04L 9/00* (2022.01)
- *G06V 40/10* (2022.01)
- *G06V 40/50* (2022.01)

(52) U.S. Cl.
CPC ............ *H04L 9/3271* (2013.01); *G06V 40/53* (2022.01); *H04L 2209/46* (2013.01)

(58) Field of Classification Search
CPC ............ G06Q 20/382; G06Q 20/40145; H04L 63/0861; H04L 67/141; H04L 9/008; H04L 9/3231; H04L 9/3271; H04L 2209/56; H04L 2209/80; H04W 12/06
See application file for complete search history.

(56) References Cited

U.S. PATENT DOCUMENTS

| | | |
|---|---|---|
| 2015/0127710 A1 | 5/2015 | Ady et al. |
| 2016/0055378 A1 | 2/2016 | Anderson et al. |

FOREIGN PATENT DOCUMENTS

| | | | |
|---|---|---|---|
| WO | 2017075063 | 5/2017 | |
| WO | WO-2017075063 A1 * | 5/2017 | ............. G06F 21/32 |

OTHER PUBLICATIONS

PCT/US2018/044139 , "International Preliminary Report on Patentability", dated Mar. 26, 2020, 11 pages.

Application No. EP18856210.2 , Extended European Search Report, dated Sep. 25, 2020, 7 pages.

\* cited by examiner

EFFICIENT HANDS FREE INTERACTION USING BIOMETRICS

CROSS-REFERENCE TO RELATED APPLICATIONS

This application is a National Stage of International Application No. PCT/US2018/044139, International Filing Date Jul. 27, 2018, which claims priority to U.S. Patent Application No. 62/559,406, filed on Sep. 15, 2017, and U.S. Patent Application No. 62/562,740, filed on Sep. 25, 2017, which are herein incorporated by reference in their entirety for all purposes.

BACKGROUND

Biometric instances, such as fingerprints and iris scans, are typically unique among users and are difficult to replicate or forge. As such, biometric instances are useful tools for authenticating users, e.g., in airport security screenings to verify a traveler's identity before they board a plane. The traveler can have their iris or palm scanned, and the biometric instance can be used to search a database of biometric instances in order to verify the traveler's stated identity. Biometric instances can also be used by users in order to prove that they have authorized an interaction. As an example, if a user wants to open an electronic gate to let a guest into their home, the user can scan their palm to prove to a control system that the user, and not an imposter, is requesting the gate be opened.

However, biometric instances are sensitive personally identifying information (PII). A stolen biometric instance can be used to perform identity fraud by allowing a malicious entity to convincingly impersonate a user. As such, biometric instances stored in electronic form can be safeguarded in order to prevent them from being stolen by thieves and hackers, for example, by being stored in encrypted form or stored on a secure memory element. Biometric matching procedures can be designed to reduce the risk of exposing biometric instances, using techniques such as secure multi-party computation, fuzzy extraction, and homomorphic encryption.

Unfortunately, these techniques are computationally slow. In biometric matching processes where a first biometric instance has to be matched against a large number of second biometric instances, the total amount of time needed to compare the first biometric instance against the second biometric instances can be large. In some cases, time constraints can make biometric matching infeasible in applications where it would otherwise be useful. While biometric matching could be useful in airport security, matching a traveler's biometric against a large collection of biometrics could take several minutes, which is too long when a security checkpoint needs to process hundreds of travelers per hour.

Embodiments of the invention solve these and other problems, individually and collectively.

SUMMARY

Embodiments of the invention relate to methods and systems for performing demographics filtering based on biometric instances. This demographics filtering can be used in order to improve the speed and efficiency of a biometric matching process, such as a biometric matching process used to verify a user's identity (e.g., as an part of an airport security screening process), or authorize an interaction (e.g., a payment transaction between a user and a merchant). The biometric matching process may involve capturing a first biometric instance corresponding to a user, and comparing that biometric instance to second biometric instances in order to determine a match, e.g., comparing an iris scan to iris scans stored on mobile devices (such as smart phones) connected to a network. By performing demographics filtering, fewer biometric matching processes need to be performed. As a result, embodiments of the invention provide improvement in speed and efficiency over conventional biometrics matching systems.

As an example, a group of 20 users in a hardware store may each operate a mobile device, such as a smartphone. The users may use their smart phones to make calls, send text messages, and make payments or conduct transactions. The mobile devices may each store a biometric instance corresponding to their user, such as a digital scan of a fingerprint. When a particular user wants to pay for their purchases and leave, the user may have their fingerprint scanned at an access terminal. The access terminal may use biometric matching to identify the mobile device corresponding to that user. The access terminal may accomplish this by identifying the mobile device that stores a fingerprint matching the fingerprint scanned at the access terminal. Once the mobile device has been identified, the access terminal can conduct a further interaction with that mobile device, e.g., a payment transaction between the mobile device and the access terminal and/or the merchant or resource provider operating the hardware store Without demographics filtering, the access terminal may have to compare the captured biometric instance against biometric instances corresponding to all 20 users until a match is identified. This can slow down the checkout process and inconvenience users. With demographics filtering, however, the access terminal can identify candidate users and candidate user mobile devices before performing biometrics matching. In some cases, it may be possible to reduce the amount of biometrics matching by a factor of 10 or more, i.e., instead of performing 20 biometrics matches, the access terminal may only perform two biometrics matches. Embodiments of the invention provide a considerable improvement in speed over conventional biometric matching systems.

Demographics information, used in demographics filtering, can be inferred from a biometric instance. For example, a user's age, biological sex, or ethnicity can be inferred from a biometric instance such as an iris scan. While there may be 20 users in the exemplary hardware store, only two or three of those users may be men with black hair in their mid-fifties, or women with blonde hair in their early twenties. The access terminal can capture a first biometric instance corresponding to a user, infer demographics information from the first biometric instance, use the demographics information to identify candidate users and candidate user mobile devices and perform a biometric matching process with the candidate user mobile devices. The access terminal can then perform a further interaction with the user or the user mobile device, for example, a hands-free checkout transaction with the user mobile device.

As a result of demographics filtering, embodiments of the invention are faster and more computationally efficient than conventional hands-free biometric systems. Additionally, because biometric instances are matched with a small group of candidate user mobile devices, embodiments of the invention reduce the exposure of personally identifiable information, such as biometric instances, improving information security.

One embodiment of the invention includes a method of identifying a user comprising: receiving messages, by an access terminal, from a group of mobile devices operated by a group of users; capturing, by the access terminal, a first biometric instance from a user of a mobile device within the group of users; inferring, by the access terminal from the first biometrics instance, demographics information; determining, by the access terminal, a plurality of candidate user mobile devices from the group of mobile devices using the demographics information; receiving, from the plurality of candidate user mobile devices, a plurality of biometric match determinations, wherein the plurality of biometrics match determinations are based on a comparison of the first biometrics instance with second biometrics instances stored on the candidate user mobile devices; identifying the mobile device of the user based on a biometrics match in the plurality of biometrics match determinations; and performing, by the access terminal, a further interaction with the mobile device.

Another embodiment includes an access terminal comprising: a processor; and a non-transitory computer readable medium coupled to the processor, the non-transitory computer readable medium comprising code, executable by the processor for performing the method according to the first embodiment.

Another embodiment includes a method comprising: transmitting, by a mobile device to an access terminal, a message, wherein the access terminal thereafter captures a first biometrics instance from a user of the mobile device, infers demographics information from the first biometrics instance, determines a plurality of candidate user mobile devices from a group of mobile devices using the demographics information; generating, by the mobile device, a match determination based on a comparison of the first biometrics instance with a second biometrics instance stored on the mobile device; and transmitting, by the mobile device, the match determination to the access terminal, wherein the access terminal identifies the mobile device of the user based on a biometrics match in the match determination and performs a further interaction with the mobile device.

Another embodiment includes a mobile device comprising: a processor; and a non-transitory computer readable medium coupled to the processor, the non-transitory computer readable medium comprising code, executable by the processor for performing the method according to the third embodiment.

TERMS

Figure 1:
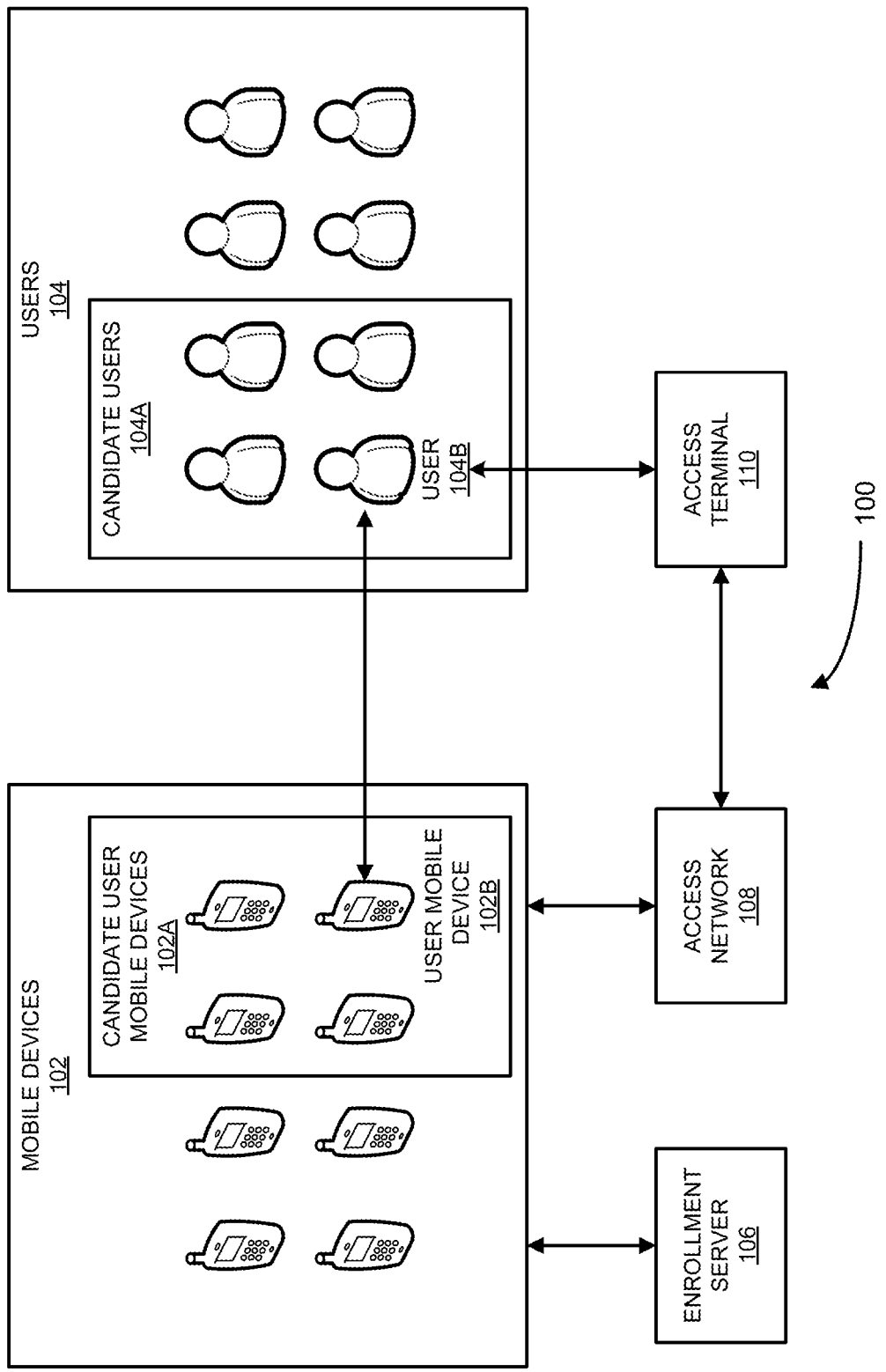
FIG. 1 shows a system block diagram of a mobile device interaction network according to some embodiments of the invention.

Prior to discussing specific embodiments of the invention, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "mobile device" may comprise any electronic device that may be transported and operated by a user, which may also provide remote communication capabilities including a mobile phone (wireless) network, wireless data network (e.g., 3G, 4G, or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device). A mobile device may store and capture biometric instances, using, for example, a camera to capture a facial scan or a touch screen to capture a finger print. A mobile device may store biometric instances on a secure memory element. Additionally, a mobile device may generate or infer demographics information from a captured biometric instance. A mobile device may perform a biometrics matching procedure with an access terminal, using techniques such as secure multi-party computation or fuzzy extraction.

A "user" may include an individual. In some embodiments, a user may be associated with one or more personal accounts and/or mobile devices. The user may also be referred to as a cardholder, account holder, or consumer.

An "access terminal" may be any suitable device that provides access to a remote system. An access terminal may also be used for communicating with a merchant computer, a transaction processing computer, an authentication computer, or any other suitable system. An access terminal may generally be located in any suitable location, such as at the location of a merchant. An access terminal may be in any suitable form. Some examples of access terminals include point of sale (POS) terminals, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access terminal may use any suitable contact or contactless mode of operation to send or receive data from, or associated with, a user mobile device. In some embodiments, where an access terminal may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal. An access terminal may be capable of capturing biometric instances using a biometric interface, such as a high resolution camera user to perform iris scans. An access terminal may also be capable of generating demographics information from biometrics instances, e.g., determining a user's ethnicity from an iris scan. Access terminals may also perform demographics filtration and biometrics matching during or preceding an interaction. For example, an access terminal may perform a biometric matching procedure as part of authorizing a transaction between a customer and a merchant operating the access terminal.

An "access network" may refer to a network associated with an access terminal. An access network may include an array of devices which support the access terminal by providing some needed functionality. For example, an access network may be an array of antennas or beacons (such as Wi-Fi or Bluetooth beacons) designed to communicate with a collection of mobile devices on behalf of the access terminal. An access network may include a local area network, wide area network, or networks such as a cellular network or the Internet.

The term "biometrics instance" may include information related to a biological observation. A biometric instance may include biometric data corresponding to a biometric sample, or a biometric template derived from the biometric sample or the biometric data. A biometric instance may be used to verify the identity of a user. In some embodiments, a device such as a mobile device or an access terminal may capture a biometric instance. A biometric instance may be captured via a biometric interface, hardware used to capture biometric instances. For example, a biometric instance may be captured via a biometric interface such as an iris scanner, comprising an infrared light source and a camera. Examples of biometric instances include digital representations of iris scans (e.g., binary codes that represent an iris), fingerprints, voice recordings, face scans, etc. Biometric instances may be represented as vectors for the purpose of comparing biometric instances, e.g., two biometric instances may be compared by performing a scalar product of two vector representations of those biometric instances. Biometric instances may be stored in an encrypted format and/or on a secure memory of a mobile device.

A "derivative" of a biometric instance may include any information or data derived from the biometric instance, or any information or data generated in order to process the biometric instance. As an example, a garbled circuit used to compare a first biometric instance and a second biometric instance as part of a secure multi-party computation can be a derivative of the first biometric instance and/or the second biometric instance. As another example, the output of a function that takes a biometric instance as an input can be a derivative of a biometric instance, such as a function that produces the negation of a biometric instance (i.e., if a biometric instance is represented by a binary vector such as 1010101, the negation 0101010 is a derivate of a biometric instance). Other examples include encrypted biometric instances and masked biometric instance (e.g., a biometric instance summed with a random value). A random string produced by a fuzzy extraction is another example of a derivative of a biometric instance.

The term "demographics information," may refer to information that describes the demographic characteristics of a user. Demographics information may include information such as the user's age, height, weight, hair color, facial structure, biological sex, ethnicity, socio-economic status, etc. In some cases, demographics information may be inferred from a biometric instance. For example, an iris scan may be used to infer a user's ethnicity. Demographics information may be used to filter users, e.g., selecting users with specific demographics information (e.g., black-haired women, red-haired men, etc.). Examples of biometric instances include fingerprint scans, palm print scans, palm vein scan, hand geometry scan, iris scan, retina scan, face scan, and voice recordings, among others.

The term "cryptographic key" may refer to something used in encryption or decryption. As an example, a cryptographic key can refer to a product of two large prime numbers. A cryptographic key may serve as an input in a cryptographic process or cryptosystem, such as RSA or AES, and may be used to encrypt plaintext and produce a ciphertext output, or decrypt ciphertext and produce a plaintext output.

The term "plaintext" may refer to text that is in a plain form. For example, plaintext could refer to text which a human or a computer could read without any processing, such as the phrase "hello, how are you?" It may also refer to text which is in an unencrypted form. Numbers or other symbols may also qualify as plaintext.

The term "ciphertext" may refer to text that is that is in an encrypted form. For example, this could refer to text which must be decrypted before it can be understood by a human or computer. Ciphertext may be generated by any number of cryptographic algorithms, such as RSA or AES.

The term "fuzzy extraction" may refer to a cryptographic technique to convert biometric data into a random string, with some tolerance for noise. Cryptographic techniques may then be applied to the random string in order to encrypt and authenticate biometric record, e.g., the random string produced from the biometric data may be used as a cryptographic key. A user that can successfully decrypt ciphertext encrypted using the random string can verify that they are in possession of the biometric instance used to generate the random string.

A "secure multi-party computation" may include a secure computation performed by multiple parties. In a secure multi-party computation, each party may possess some inputs to the computation. For example, in a computation involving determining whether two biometric instances match, each party may possess one of the two biometric instances. In some secure multi-party computations, the parties involves do not share their inputs with one another and the output of the secure multi-party computation cannot be used to determine the input of each party. In this way, each party's input remains secure. In embodiments of the invention, a mobile device and an access terminal may perform a secure multi-party computation in order to determine if a first biometric instance generated by the access terminal matches a second biometric instance stored on the mobile device. The output of the secure multi-party computation may be a biometric match determination, indicating whether the two biometric instances match or do not match.

A "resource provider" may be an entity that can provide resources such as goods, services, information and/or access. Examples of resource providers include merchants, governmental entities, entities that provide access to secure locations, data access providers, etc. A "merchant" may be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer acquirers. An acquirer may operate an acquirer computer, which can also be generically referred to as a "transport computer."

An "authorizing entity" may be an entity that authorizes a request. Examples of an authorization entities may include issuers, governmental agencies, document repositories, access administrators, etc. An "issuer" may typically refer to a business entity (e.g., a bank) that maintains an account for a user. An issuer may also issue payment credentials stored on a mobile device, such as a cellular telephone, smart cart card, tablet, or laptop to the consumer. An authorizing entity may operate an authorization computer.

"Authentication data" may include any data suitable for proving that something is true and valid. Authentication data may be obtained from a user or a device that is operated by the user. Examples of authentication data obtained from a user may include PINs (personal identification numbers), passwords, etc. Examples of authentication data that may be obtained from a mobile device may include device serial numbers, hardware security element identifiers, device fingerprints, phone numbers, IMEI numbers, biometric instances stored on the mobile device, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speed-Pass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact contactless mode. In some embodiments, a mobile device can function as a payment device (e.g., a mobile device can store and be able to transmit payment credentials for a transaction).

A "credential" may be any suitable information that serves as reliable evidence of worth, ownership, identity or authority. An "access credential" may be a credential that may be used to gain access to a particular resource (e.g., a good, service, location, etc.). A credential may be a string of numbers, letters, or any other suitable characters, or any object or document that can serve as confirmation. Examples of credentials include identification cards, certified documents, access cards, passcodes and other login information, payment account numbers, access badge numbers, payment tokens, access tokens, etc.

"Payment credentials" may include any suitable information associated with an account (e.g., a payment account and/or payment device associated with the account). Such information may be directed related to the account or may be derived from information related to the account. Examples of account information may include a PAN (primary account number or "account number"), user name, expiration date, CVV (card verification value), dCVV (dynamic card verification value), CVV2 (card verification value 2), etc. Payment credentials may be any information that identifies or is associated with a payment account. Payment credentials may be provided in order to make a payment from a payment account. Payment credentials can also include a user name, an expiration date, a gift card number or code, and any suitable information.

A "token" may be a substitute value for a real credential. A token may be a type of credential, and may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token 4900 0000 0000 0001" may be used in place of a PAN "4147 0900 0000 1234." In some embodiments, a token may be "format preserving" and may have a numeric format that conforms to the account identifier used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generate such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that is sent to request authorization for a transaction. In some embodiments, an authorization request message may be an electronic message that is sent to a payment processing network and/or an issuer of a payment card to request authorization for a transaction.

An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approval—transaction was approved; Decline—transaction was not approved: or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "device code" or "device identifier" may be a code that is specifically associated with a device (e.g., only one device). The device code can be derived from any device specific information including, but not limited to include one or more of a secure element identifier (SE ID), an IMEI number, a phone number, a geo-location, a device serial number, a device fingerprint, etc. Such codes may be derived from such information using any suitable mathematical operation including hashing and/or encryption. Device codes may include any suitable number and/or type of characters.

DETAILED DESCRIPTION

As stated above, embodiments of the invention include methods and systems for demographics filtering in order to more efficiently perform biometric based hands-free interactions. Generally, an access terminal can capture a biometric instance corresponding to a user, infer demographics information based on the captured biometric instance, determine a plurality of candidate user mobile devices based on the demographics information, and perform a biometric comparison with the candidate user mobile devices. The biometric comparison resulting in the identification of a user mobile device, before the access terminal performs a further interaction (such as a ticket verification, allowing access to a secure building, a transaction, etc.) with a user mobile device corresponding to the user whose biometric instance was captured.

In an enrollment phase, a user may enroll in a hands-free biometric verification system. This enrollment may involve special software, such as an enrollment application downloaded from an enrollment server. Using the enrollment application, the user may capture a biometric instance using their mobile device, and store the biometrics instance on secure memory of their mobile device. As an example, the user may perform an iris scan using the camera on their smartphone, and the iris scan may be stored on a secure memory element of the smartphone. Further, the smartphone and the enrollment application may be used to infer demographics information from the biometric instance, such as the user's age, ethnicity, and biological sex. During the enrollment phase, the user may be prompted to verify their demographics information. After the enrollment phase, the user may use their mobile device as part of any appropriate hands-free biometric verification, for example, in boarding an airplane, entering a secure building, or as part of a hands-free checkout experience.

After enrolling, the user and their mobile device may enter the vicinity of an access terminal. For example, the user may enter a store that uses an access terminal (such as a payment terminal or point of sale terminal) for biometric matching in order to conduct transactions with customers in the store. The user may be carrying their phone in their pocket, purse, etc. The access terminal may be a payment terminal or point of sale terminal located in the store. The mobile device may use its wireless communication capabilities to establish communication with the access terminal, either directly, or via an access network, such as a network of antennas or beacons distributed through the store. The mobile device may transmit a message comprising the demographics information, an electronic address such as a phone number, and a mobile device identifier such as a Mobile Station International Subscriber Directory Number (MSISDN) to the access terminal. The access terminal may maintain a temporary and dynamic list of demographics information, electronic addresses, and mobile device identifiers corresponding to all mobile devices in the vicinity of the access terminal. As new mobile devices enter the vicinity of the access terminal, the access terminal may communicate with those mobile devices and include their demographics information, electronic address, and mobile device identifier in the list. Similarly, as a mobile device leave the vicinity of the access terminal, the access terminal may remove the corresponding demographics information, electronic address, and mobile device identifier from the list.

The user may shop as normal at the store. When the user enters the checkout line, the access terminal may capture a biometric instance from the user, e.g., using an iris scanner located in the checkout line. From this biometric instance, the access terminal may infer demographics information corresponding to the user. The access terminal may compare the demographics information to demographics information stored in the list of demographics information, and determine any candidate user mobile devices with matching demographics information.

The access terminal may communicate with the candidate user mobile devices using the mobile device identifiers or electronic addresses corresponding to each candidate user mobile device. The access terminal may perform a biometric matching procedure with each candidate user mobile device and receive a plurality of biometric match determinations, indicating whether the biometric instance stored on each candidate user mobile device matches the biometric instance captured by the access terminal. The mobile device corresponding to the user should produce a positive biometric match determination, while all other mobile devices should produce negative responses. The biometrics matching procedure can involve homomorphic encryption, fuzzy extraction, or secure multi-party computation, among other techniques. In this way, each user's biometric information remains secure.

The access terminal can then conduct a further interaction with the mobile device belonging to the user, such as a hands-free transaction. The user's mobile device and access terminal can complete a hands free transaction without the involvement of the user. Afterward, the user can then exit the store with their purchased goods without having to swipe their credit card, enter a personal identification number, sign a receipt, or perform any other actions associated with a non-hands-free checkout procedure.

Although the preceding example involved the use of demographics filtering for a biometric based hands-free checkout procedure, it should be understood that embodiments of the invention can be practiced in a number of other contexts and aren't limited to transactions. For example, demographics filtering could be used to make a biometric based hands-free airplane boarding procedure more efficient.

Embodiments of the invention present advantages over conventional biometric based verification procedures. One advantage is that the user experience is improved by front-loading access terminal processing. In a conventional store, such as a grocery store, a user arrives in a checkout line, waits for their turn, presents their credit card or debit card, enters their PIN, waits for approval, then bags their goods and leaves. By contrast, an access terminal according to embodiments of the invention can capture a biometric instance corresponding to the user as the user enters the checkout line. As the user waits in line, the access terminal can process their biometric instance and perform demographics filtering and biometric matching. By the time the user reaches the front of the queue, the user's mobile device may have already been identified, and the mobile device may have already complete the payment transaction with the access terminal. As a result, the user may simply bag their goods and leave, without having to swipe their credit card, enter a PIN or sign a receipt.

As another advantage over conventional biometric based hands-free verification systems, embodiments of the invention greatly reduce the number and complexity of messages that have to be communicated between the access terminal and mobile devices in its vicinity. In large spaces, such as a department store, an airport departure gate, or the line at an amusement park, there may be hundreds of users in the access terminal's vicinity at any one time. In a conventional system without demographics matching, an access terminal may have to communicate with every mobile device operated by every user. Biometrics matching can be time consuming, in some instances taking a full second to complete a single biometrics match with a single mobile device, which can be infeasible for large numbers of mobile devices. However, the use of demographics filtration by embodiments of the invention may allow the access terminal to narrow the search space by a factor of ten, potentially reducing the amount of time it takes to identify a single user by a factor of ten (e.g., instead of performing a biometrics match with twenty mobile devices, performing a biometrics match with two mobile devices). Additionally, this increases the number of customers that a venue (e.g., a store, airport departure gate, etc.) can support.

Additionally, by filtering demographics information before performing biometric matching, embodiments of the invention also reduce the number of false positive biometric matches.

Another indirect advantage of embodiments of the invention is a more reliable connection between the access terminal and mobile devices. In a typical hands-free biometric verification system, the power of each individual antenna or BLE station is lowered in order to improve spatial resolution. By performing demographics filtering, there is less reliance on antennas or beacons to filter mobile devices. As a result, higher power beacons can be used, increasing the connection strength between the access terminal and mobile devices.

Embodiments of the invention are discussed in greater detail below with reference to FIGS. 1-8.

FIG. 1 shows an exemplary system 100 according to some embodiments of the invention. The system 100 comprises mobile devices 102, users 104, enrollment server 106, access network 108, and access terminal 110. Messages between the mobile devices 102, enrollment server 106, access network 108, and access terminal 110 may be transmitted using a secure communication protocol such as, but not limited to, File Transfer Protocol (FTP); Hypertext Transfer Protocol (HTTP); Secure Hypertext Transfer Protocol (HTTPS), Secure Socket Layer (SSL), ISO (e.g., ISO 8583) and/or the like.

Mobile devices 102 may be in communication with enrollment server 106, access network 108, and access terminal 110 via access network 108. Mobile devices 102 may be used by users 104. Candidate user mobile devices 102A may comprise a subset of mobile devices 102. Candidate user mobile devices 102A may correspond to candidate users 104A, which may comprise a subset of users 104. User mobile device 102B may comprise a candidate user mobile device corresponding to user 104B, a user of candidate users 104A. User 104B may interact with user mobile device 102B, e.g., by making and receiving calls, sending text messages, etc. User 104B may also interact with user mobile device 102B during a biometric based hands-free enrollment process involving enrollment server 106. Mobile devices 102 are described in more detail below with reference to FIG. 2.

In general terms, during the course of a biometric based hands-free interaction, access terminal 110 may capture a first biometric instance corresponding to user 104B. User 104B may be a user that is having their biometric instance matched for some purpose. For example, if users 104 are customers in a store, user 104B may have their biometric instance matched as part of a biometric based hands-free checkout procedure. Access terminal 110 may match the first biometric instance corresponding to user 104B to a second biometric instance stored on user mobile device 102B, and if the biometric instances match, access terminal 110 may perform a hands-free payment transaction with user mobile device 102B, such that user 104B pays for purchased goods using user mobile device 102B without having to enter any payment information, sign a receipt, etc. The user may have to enroll in the biometric based hands-free checkout experience before they are able to use their biometric as part of a payment authorization.

The following is an example of an enrollment procedure between mobile device 102B and enrollment server 106. User 104B may use mobile device 102B to communicate with the enrollment server 106. As an example, the enrollment server 106 may host a website, and user 104B may navigate to the website using a web browser installed on mobile device 102B. The website may include any logic or user interface elements that allow user 104B to interact with the enrollment server 106 via mobile device 102B. For example, the website may have a form that allows the user to enter enrollment information, such as their name, date of birth, address, electronic address (e.g., phone number), a mobile identifier corresponding to the mobile device, a desired username, a desired password, etc.

The enrollment server 106 may perform any operations involved in the enrollment of a user and mobile device in the biometric hands-free experience. This may include, for example, generating and maintaining records of mobile devices 102, users 104, user accounts, etc. The enrollment server 106 may additionally provision any software or information to the mobile device 102 that is needed for the biometric-hands free experience. This may include a mobile application that allows mobile devices 102B to capture biometric instances (e.g., perform an iris or face scan) and/or communicate with access terminal 110 wirelessly, either directly or via an access network 108. The enrollment server may provision mobile devices 102 with cryptographic keys in order for mobile devices 102 to encrypt biometric instances and demographic information and decrypt any information transmitted to mobile devices 102 from access terminal 110.

Figure 2:
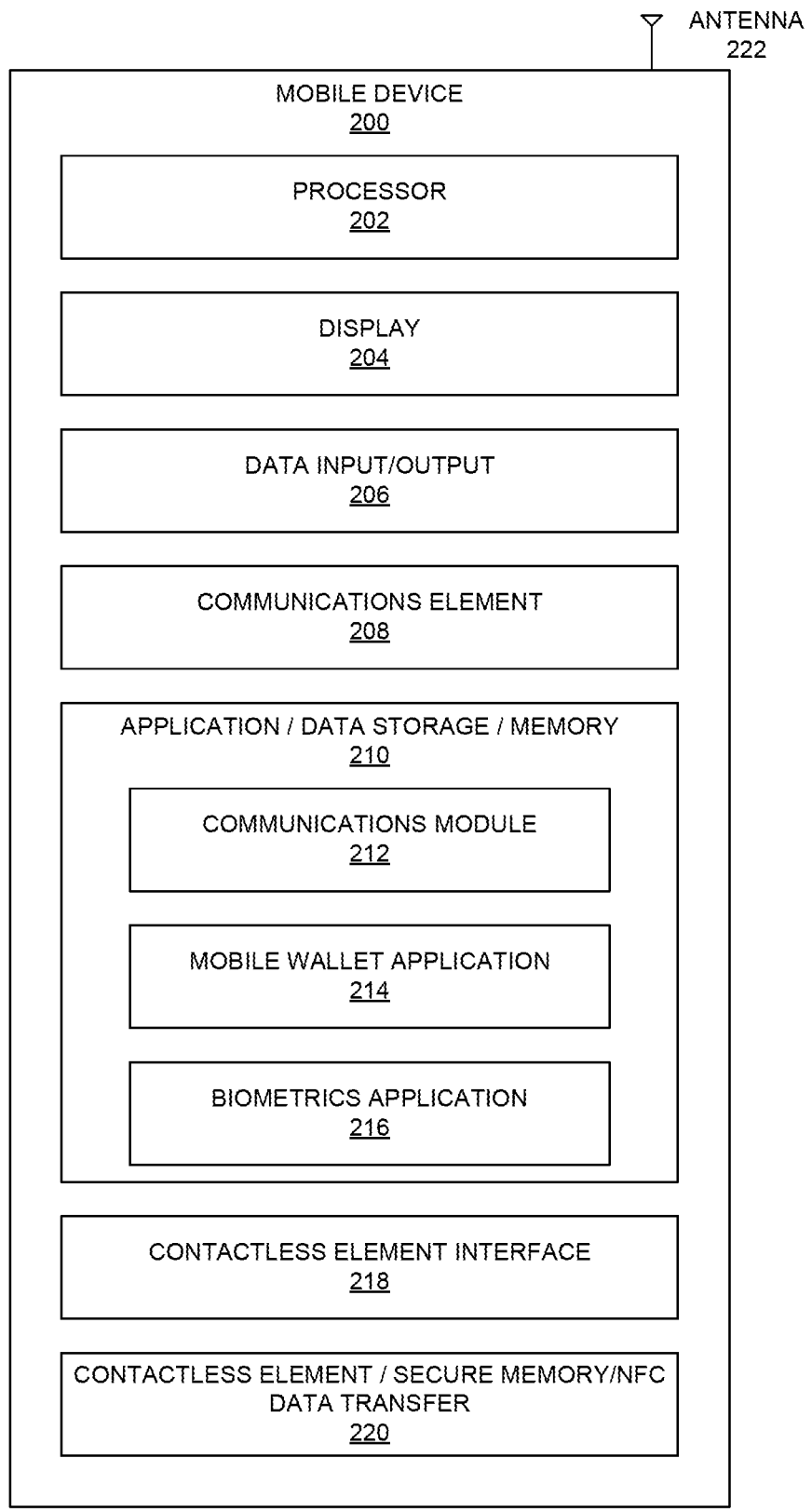
FIG. 2 shows a system block diagram of a mobile device according to some embodiments of the invention.

FIG. 2 shows an exemplary mobile device 200 according to some embodiments of the invention. Mobile device 200 may include circuitry that is used to enable certain device functions, such as wireless communication or telephony. The functional elements responsible for enabling those functions may include a processor 202 that can execute instructions that implement the functions and operations of the device. Processor 202 may access data storage 210 (or another suitable memory region or element) to retrieve instructions or data used in executing the instructions. Data input/output element 206, such as a keyboard or touchscreen, may be used to enable a user to operate the mobile device 200 (for example, allowing the user to navigate to a mobile wallet application 214). Data input/output 206 may also be configured to output data (via a speaker, for example). Display 204 may also be used to output data to a user. Communications element 208 may be used to enable data transfer between mobile device 200 and a wired or wireless network (via antenna 222, for example), enable data transfer functions, and may be used to assist in connectivity to the Internet or another network. Mobile device 200 may also include contactless element interface 218 to enable data transfer between contactless element 220 and other elements of the device, where contactless element 220 may include a secure memory and a near field communication data transfer element (or another form of short range communication technology). As noted, cellular phones, smart phones, wearable devices, laptop computers, or other similar devices are examples of mobile devices in accordance with embodiments.

The data storage 210 may comprise a computer readable medium that may also comprise a number of software modules, such as a communications module 212, a mobile wallet application 214, and a biometrics application 216.

The communications module 212 may comprise code enabling the processor 202 to implement or enable communications between the mobile device 200 and other devices, such as other mobile devices or an access terminal. The communications module 212 may allow communication according to any appropriate protocol, such as TCP, UDP, IS-IS, OSPF, IGRP, EIGRP, RIP, BGP, etc. It may enable secure communications by enabling the processor 202 to establish a secure or encrypted communication channel between the communication device 200 and other devices. For example, the communications module 212 may comprise code executable by the processor 202 for performing a key exchange (such as a Diffie-Hellman key exchange) between mobile device 200 and another device. The communication module 212 may further allow the transmission of access tokens, including payment tokens to other devices, such as an access terminal.

The mobile wallet application 214 may comprise code enabling the mobile device 200 to manage tokens. For example, the mobile wallet application may comprise code enabling the processor 202 to retrieve access tokens stored in the secure memory 220 via contactless element interface 218. The mobile wallet application 214 may further comprise code enabling the communications device 200 to display any suitable token information, for example, the time and date during which an access token was provisioned, an alias or identifier for the access token, the time and date of the most recent interaction or transaction involving the access token, etc. Further the mobile wallet application 214 may comprise code enabling the processor 202 to display a graphical user interface (GUI) that enables a user to activate token related functionality. Further, the mobile wallet application 214 may comprise code enabling the communication device 200 to send tokens to an access terminal, for example, during a transaction with a merchant.

The biometrics application 216 may comprise code enabling the mobile device 200 to perform any and all methods involved in a biometric based hands-free interaction system. These methods may be better understood with reference to FIG. 4 and FIG. 5 and the discussion below. The biometrics application 216 may have been provisioned to mobile device 200 during an enrollment process via an enrollment server.

The functions of biometric application 216 may include capturing biometric instances via data input/output 206. A user may use mobile device 200 as part of an initial biometric based hands free interaction enrollment procedure. During the initial enrollment procedure, the mobile device 200 may be used to capture a biometric instance, such as a face scan. The biometric application 216 may be used to capture this biometric instance and store the biometric instance, either in encrypted or unencrypted form on secure memory 220. Additionally, the biometric application may be used to infer demographics information from captured biometric instances. For example, a face scan may be used to determine the age, biological sex, and ethnicity of a user operating mobile device 200.

Biometrics application 216 may also include code or instructions, executable by the processor for participating in a biometric based hands-free interaction system, such as a biometrics based hands-free checkout experience at a store. This code or instructions may include code for communicating with an access terminal and providing information such as demographics information and biometric instances to an access terminal. Additionally, biometrics applications 216 can comprise code allowing mobile device 200 to perform demographics matching, i.e., determining if a first set of demographics information is identical or similar to a second set of demographics information.

Further, the biometric application 216 may include code or instructions for performing biometrics matching, including performing secure multi-party computations, such as garbled circuit protocols, fuzzy extraction, and homomorphic encryption such as Paillier encryption. Mobile devices such as mobile device 200 may use homomorphic encryption, secure multi-party computation, or fuzzy extraction processes to perform the match determinations. Biometrics matching is discussed in greater detail below, with reference to FIGS. 4 and 5.

Figure 3:
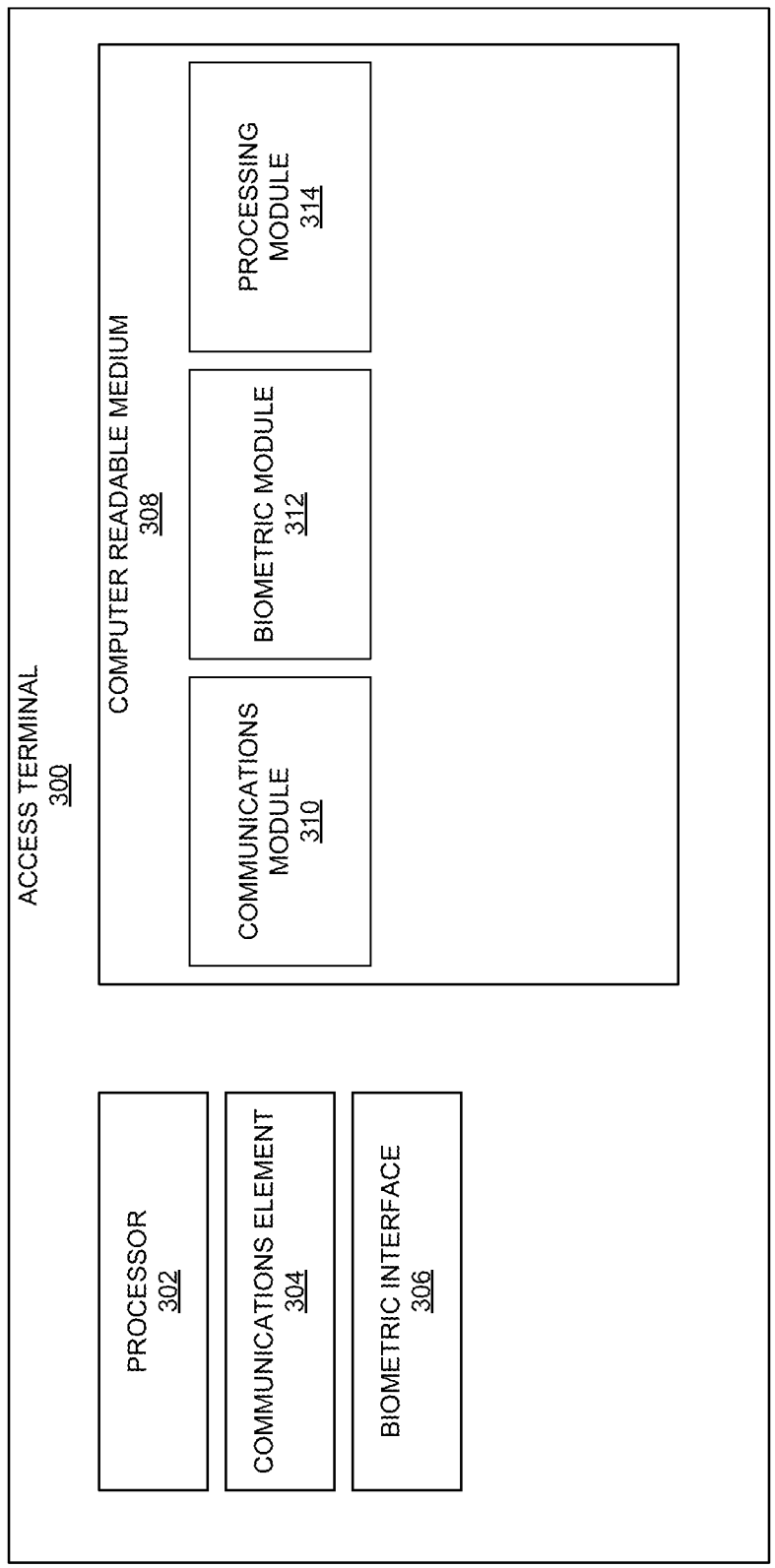
FIG. 3 shows a system block diagram of an access terminal according to some embodiments of the invention.

FIG. 3 shows an exemplary access terminal 300 according to some embodiments of the invention. The access terminal may comprise a processor 302, a communications element 304, a biometric interface 306, and a computer readable medium 308 comprising a communications module 310, a biometrics module 312, and a processing module 314.

The processor 302 may be any suitable processing apparatus or device as described above. The communications element 304 may comprise a network interface that enables the access terminal 300 to communicate with other computers or systems over a network such as the Internet.

Biometrics interface 306 may comprise hardware used to capture biometric instances from users. As an example, biometric interface 306 may comprise a retina scanner, including a low energy infrared light emitter and infrared light detector. The retina scanner may shine infrared light onto a user's eye, then record reflected infrared light picked up by the detector. The recorded light may be compiled into a data file that can be stored on computer readable medium 308. The biometric interface may be supported by the biometric software module 312, which may comprise code, executable by the processor 302, for controlling the operation of the biometrics interface 306. As an example, the biometric module 312 may comprise signal processing algorithms or other optical processing algorithms used to convert a sample data file into a biometric instance. As an alternative to a retina scanner, biometrics interface 306 could be a fingerprint scanning device, a palm vein scanner, a microphone (used to capture a biometric such as speech), a high resolution camera used for capturing face scans, etc. In some embodiments, biometrics interface 306 may also comprise non-hardware components that may be used as part of a biometrics capture. For instance, biometrics interface 306 may include a chin rest, which allows a user to align their face with a face or eye scanning device.

The communications module 310 may comprise code that causes or enables the processor 302 to generate messages, reformat messages, and/or otherwise communicate with other entities or computers. This may include receiving demographics information, demographics match determinations, or biometric match determinations, among others, from mobile devices. The communication module 310 may enable the access terminal to communicate over a network according to any appropriate communication protocol, such as TCP, UDP, etc.

Biometrics module 312 may comprise code and other software routines and subroutines, executable by the processor 302 for performing biometric related operations in a biometric based hands-free interaction system, such as software used to operate biometrics interface 306 during a biometrics capture. As an example, for a face scanner, biometrics module 312 may include code used to change the aperture or focus of the scanning lens. Additionally, biometrics module 312 may comprise code, enabling the access terminal 300 to process the raw data captured by biometrics interface 306. This may include optical processing routines and subroutines used to convert raw data into a facial scan, or eigenvectors used in facial recognition.

Biometrics module 312 may also comprise code, executable by the processor 302 for inferring demographics information from a captured biometric instance. This may include evaluating the biometric instance to detect any patterns that correlate to particular demographics, such as the presence of facial wrinkles in the face scans of elderly users, or iris stroma patterns correlated with heredity and ethnicity. This code may include machine learning models, including machine learning classifiers that accept biometrics instances as feature vectors and produce a classification in the form of demographics information, such as the age, biological sex, and ethnicity of a user.

Further, biometrics module 312 may comprise code enabling the access terminal 300 to securely store and manage biometric instances and demographics information. Including any cryptographic operations necessary to securely encrypt demographics information and biometrics instances. Further, biometrics module 312 may comprise code enabling access terminal 300 to perform homomorphic encryption as part of a biometric matching procedure, as well as perform fuzzy extraction operations, such as generating a random string from a biometric instance. Biometrics module 312 may additionally allow access terminal 300 to perform secure multi-party encryption, including the use of garbled circuits and the process of oblivious transfer, in order to compare biometric instances with biometric instances stored on mobile devices.

Further, biometrics module 312 may comprise code, executable by the processor 302 for determining a plurality of candidate user mobile devices based on demographics match information, as well as determining a specific mobile device corresponding to a user based on a comparison between a biometric instance captured from the user and a biometric instance stored on the mobile device.

Processing module 314 may comprise code or instructions, executable by the processor 302 for securely handling payment information, credentials including tokens, authorization request messages, and authorization response messages. Processing module 314 may allow the access terminal 300 to receive payment credentials such as payment account numbers from mobile devices, generate an authorization request message, then forward the authorization request message to an issuer via a merchant, an acquirer, and a payment processing network. Processing module 314 may comprise code enabling a hands-free interaction with a mobile device, such as a payment transaction with a mobile device that requires no explicit input or interaction by a user of the mobile device.

Figure 4:
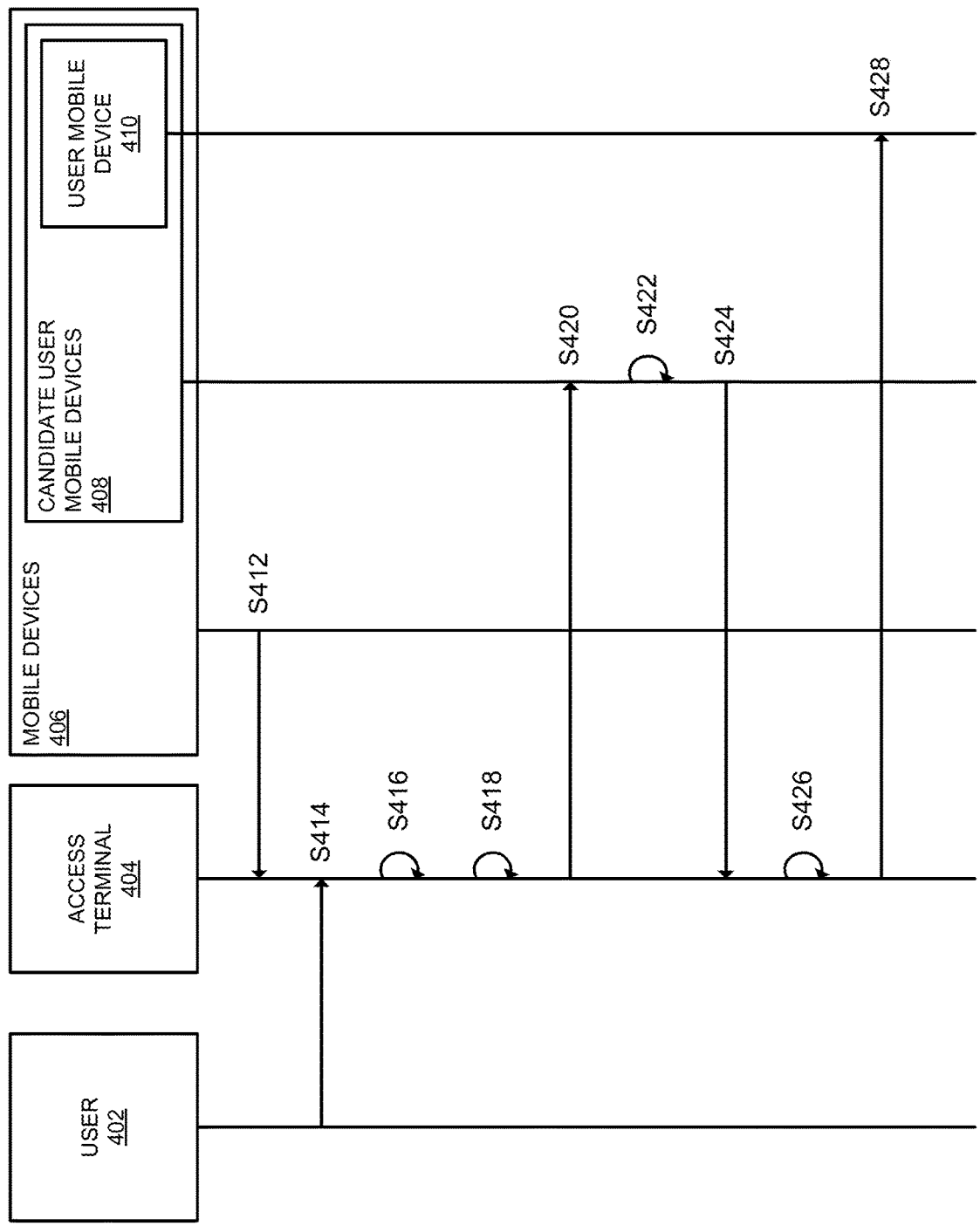
FIG. 4 shows a sequence diagram of a first method of demographics filtering according to some embodiments of the invention.
Figure 5:
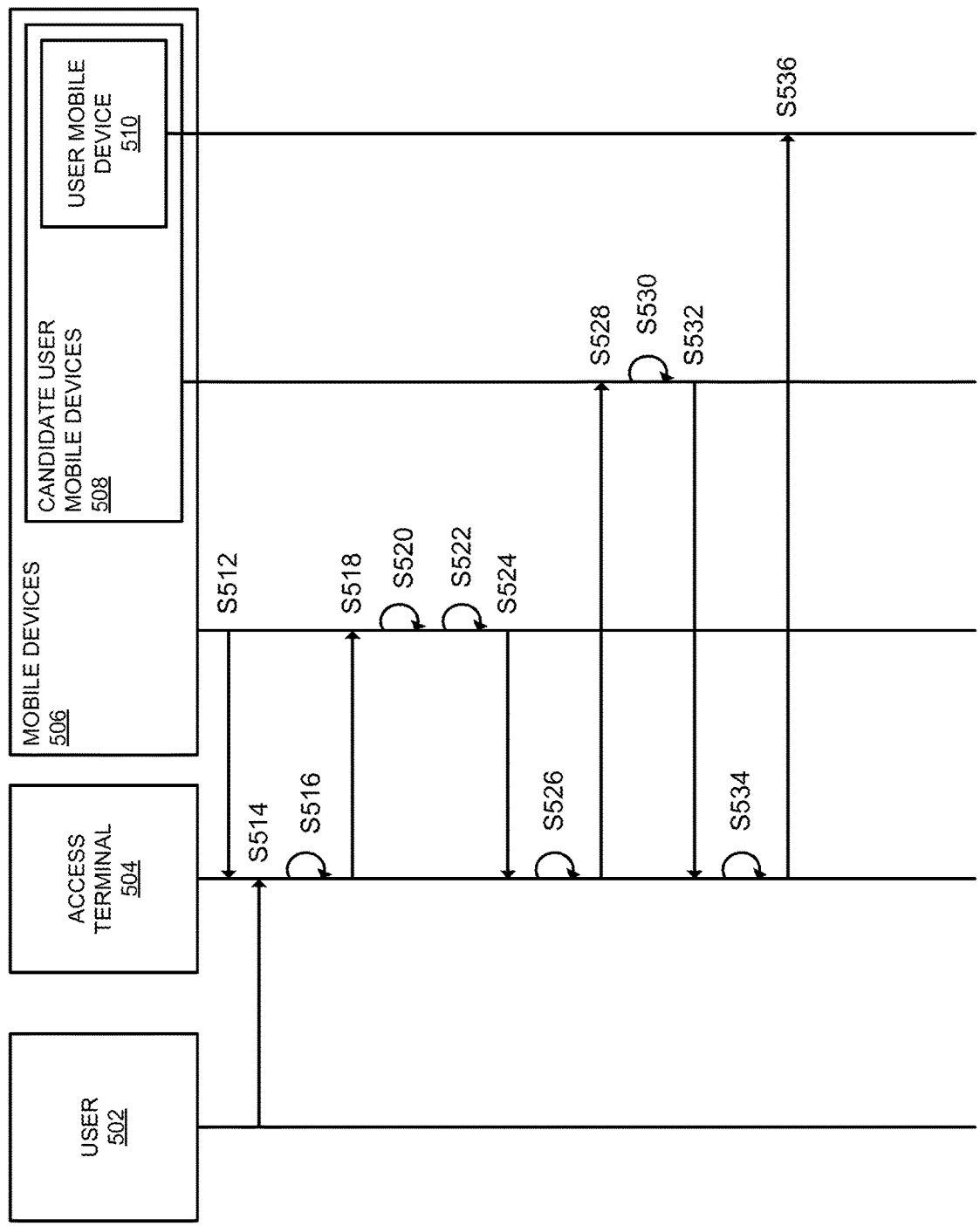
FIG. 5 shows a sequence diagram of a second method of demographics filtering according to some embodiments of the invention.

FIGS. 4 and 5 show two methods according to two embodiments of the invention. Generally, FIG. 4 shows a method in which the mobile devices transmit demographics information to an access terminal, and the access terminal compares demographics information inferred from a first biometrics interface to the demographics information received from the mobile devices. FIG. 5 shows a method in which the access terminal transmits demographics information to mobile devices, and the mobile devices compare demographics information received from the access terminal to demographics information stored on the mobile devices.

FIG. 4 shows a sequence diagram of a method of identifying a user 402 and a user mobile device 410, and conducting an interaction with user mobile device 410 according to some embodiments of the invention. In FIG. 4, access terminal 404 receives demographics information from mobile devices 406 and compares the received demographics information to demographics information inferred from a first biometric instance. An advantage of receiving demographics information from the mobile devices, rather than sending demographics information to the mobile devices, is that the user's 402 demographics information is not exposed to mobile devices 406, helping preserve the user's 402 privacy. Additionally, receiving demographics information from the mobile devices 406 may increase the speed of the system, as access terminal 404 does not need to wait to receive a group of demographics match determinations from mobile devices 406.

The method of FIG. 4 may involve a system similar to system 100 from FIG. 1. Communications between the access terminal 404 and mobile devices 406, candidate user mobile devices 408, or user mobile devices 410 are performed either directly or via an access network (not shown) such as access network 108 from FIG. 1.

The user 402 may be a user among a group of users, for example, user 402 may be a person among a group of people waiting in line to enter a baseball game. The baseball stadium may use access terminal 404 for a hands-free biometric matching process in order to verify a user's identity before allowing the user to enter the stadium. Access terminal 404 can capture biometrics information, communicate and conduct interactions with mobile devices 406, identify candidate user mobile devices 408 using demographics information, and perform a biometric matching process, evaluate biometric match determinations, and conduct a further interaction with user mobile device 410. Mobile devices 406 comprise a group of mobile devices operated by the group of users, e.g., smart phones used by people waiting in line at the baseball game. Candidate user mobile devices 408 comprises a subset of mobile devices 406 that store similar demographics information to the demographics information corresponding to user 402. For example, if user 402 is an man with black hair, candidate user mobile devices 408 may comprise all mobile devices used by men with black hair at the baseball game. User mobile device 410 is the specific mobile device used by user 402.

At step S412, access terminal 404 receives messages from mobile devices 406. These messages can comprise a group of first demographics information corresponding to a group of users, such as users 104 from FIG. 1. The group of first demographics information can include age, biological sex, ethnicity, or any other demographics information that can be inferred from a biometrics instance. In some embodiments, demographics information corresponding to each user may be collected and stored by each mobile device 406 during an enrollment process, users may capture and store biometric instances (such as a thumbprints) on their mobile devices, and additionally store demographics information, including demographics information generated from the biometric instance and demographics information manually input by the users (e.g., typed into an enrollment questionnaire using a keyboard or touch screen on mobile devices 406).

The messages may be received by access terminal 404 from mobile device 406 at any appropriate rate or any appropriate timeframe. The rate or timeframe can depend on the particular application of the access terminal 404 or interactions involving the access terminal 404. For example, for an access terminal used to conduct hands-free transactions in a store, user's 402 user mobile device 410 may transmit a message comprising the first demographics information to the access terminal 404 as the user enters the store, or alternatively as user mobile device 410 enters the range of an antenna or beacon in an access network (e.g., within 40 feet).

The messages may comprise additional information used to enable further communication between the access terminal 404 and mobile devices 406. This may include information used to perform a telecommunication handshake, cryptographic keys used to establish a secure communications channel, indicators indicating that mobile devices 406 are enrolled in the hands-free interaction system, mobile device identifiers such as MSISDN, etc. Additionally, step S412 can involve access terminal 404 transmitting other messages to mobile devices 406. These other messages may include any of the information, cryptographic keys, indicators, and identifiers described above, as well as any other relevant information. In some embodiments, access terminal 404 and mobile devices 406 may perform a key exchange, such as a Diffie-Hellman key exchange in order for the access terminal 404 to create secure communication channels for each mobile device.

Access terminal 404 may receive the information collected in the messages and use that information in order to perform later demographics matching or biometrics matching steps. For example, access terminal 404 may generate or populate a table or list comprising received demographics information and corresponding mobile identifiers and/or electronic addresses. An exemplary element in the list may be something like "male, red hair, age 30, IP address: 100.192.0.000." The access terminal 404 may maintain this list for each mobile device in range of the access terminal. As a mobile device leaves range of the access terminal 404 or becomes unresponsive, the access terminal 404 may remove the corresponding entry from the list or table. Access terminal 404 may use the information received in the message in order to identify candidate user mobile devices 408 and user mobile device 410, as well as direct or route messages to mobile devices 406, candidate user mobile devices 408, and user mobile device 410.

At step S414, access terminal 404 may capture a first biometrics instance from user 402. The first biometrics instance can comprise a fingerprint, palm print, palm veins, hand geometry, iris, retina, face, and/or a voice recording, among others. The access terminal 404 can capture the first biometrics instance using any appropriate biometric interface or apparatus. For example, the access terminal 404 can comprise a retinal scanner comprising a low energy infrared light emitter and infrared light detector. The retinal scanner can cast a low energy beam of infrared light across the user's 402 eye and record the reflection off the retinal blood vessels and surrounding tissue as the first biometric instance. Alternatively, for a voice recording, the access terminal 404 may comprise a microphone, and the microphone may be used to record a short duration of user's 402 speech as the first biometrics instance.

The first biometric instance may be generated by the access terminal 404 after some initial processing. For example, an image of an iris, may be converted into a first biometric instance comprising a 256 byte code, where each byte contains some information from the image of the iris (such as the color or brightness in a certain region of the iris image) As another example, a voice recording may be analyzed using signal processing techniques to determine frequency components, and the frequency components, along with other characteristics such as phonation, pitch, loudness, and rate, may be collected into a vector that is used as the first biometrics instance.

At step S416, the access terminal 404 may infer demographics information (e.g., age, ethnicity, and biological sex) from the first biometrics instance. Inferring demographics information from the first biometrics instance can be accomplished in a number of ways. As one example, for a first biometric instance comprising a voice recording, the access terminal 404 can evaluate the pitch range of the voice recording. The access terminal 404 can determine the biological sex of the user by comparing the pitch range to the average pitch range of males and females. If the pitch range of the voice recording is more similar to a women's average pitch, the access terminal 404 can infer demographics information such as "female."

As another example, the access terminal 404 can use a machine learning model in order to infer user's 402 demographics information, such as a machine learning classifier. A machine learning classifier can take a feature vector input (e.g., the first biometric instance, such as a vector representation of an iris scan) and produce an output classification, such as "male" or "female," or "age: 20-25" or "age: 50-60," etc. As yet another example, the access terminal 404 can use a first biometric instance such as a face scan to infer demographics information such as user's 402 age, based on the presence of wrinkles or other visual features of aging.

At step S418, the access terminal 404 can determine a plurality of candidate user mobile devices 408 from mobile devices 406 using the "second demographics information" (i.e., the demographics information inferred by the access terminal 404 in step S416). Determining the plurality of candidate user mobile devices 408 from mobile devices 406 may be performed by comparing the second demographics information to each of the first demographics information received from mobile devices 406 in the messages sent at step S412. For example, if the access terminal infers second demographics information "Male, age 30-40" from the biometric capture at step S416, and if there are three mobile devices 406, and the three mobile devices sent first demographics information to the access terminal 404 such as: "Female, age 20-30," "Male, age 30-40" and "Male, age 30-40," the access terminal can compare "Male, age 30-40" against each of the first demographics information and determine that the first demographics information sent by the second and third mobile devices 406 matches the second demographics information inferred by the access terminal 404. The access terminal 404 can determine a plurality of candidate user mobile devices 408 based on the demographics matching procedure. For example, by filtering a table or list comprising mobile identifiers and demographics information to produce a list of mobile identifiers with demographics information matching the inferred demographics information. The determined plurality of candidate user mobile devices 408 may consist of the mobile devices corresponding to the determined mobile identifiers.

In the above example, demographics information was represented as an ordered pair of biological sex and age range. However, demographics information may take other forms, for example, demographics information may be represented as a series of binary values, such as "101110101" or an alphanumeric sequence, such as "A20E4." When determining the plurality of candidate user mobile devices, access terminal 404 may compare a first alphanumeric sequence corresponding to first demographics information to a second alphanumeric sequence corresponding to second demographics information. The alphanumeric sequences may be compared using a distance metric, such as Hamming distance or Jaro-Winkler distance. Alternatively, the access terminal 404 may treat the series of binary values or alphanumeric sequences as vectors, and use the scalar or "dot" product as a distance metric between the second demographics information and each of the plurality of first demographics information. As an example, the distance between exemplary first demographics information "0101110" and second demographics information "1101010" can be 2, as exactly two bit substitutions are needed to make the first demographics information and second demographics information identical. The access terminal may determine the plurality of candidate user mobile devices 408 based on the difference between the second demographics information and the first demographics information. If the difference between the second demographics information and the first demographics information is less than a threshold value, access terminal 404 may determine that each mobile device 406 with a demographics information match is a candidate user mobile device of a plurality of candidate user mobile devices 408.

Steps S420 to S424 generally involve a biometric matching process conducted between access terminal 404 and the plurality of candidate user mobile devices 408. In general terms, step S420 involves access terminal 404 transmitting the first biometric instance to the plurality of candidate user mobile devices 408. Step S422 involves each candidate user mobile device 408 generating a match determination (or "biometric match determination") based on a comparison of the first biometric instance with a second biometric instance stored on the candidate user mobile device. Step S424 involves each candidate user mobile device 408 transmitting their biometric match determination back to access terminal 404.

It should be understood, however, that in some embodiments, the access terminal 404 may not transmit the first biometric instance to the candidate user mobile devices 408, in order to preserve the privacy of user 402. Instead the access terminal 404 and candidate user mobile devices 408 may perform a biometric matching process that does not involve the access terminal 404 transmitting the first biometric instance to candidate user mobile devices 408.

For example, rather than transmitting the first biometric instance to the candidate user mobile devices 408, the access terminal 404 could generate a random string from the first biometric instance using a method such as fuzzy extraction. The access terminal 404 can use the random string as a symmetric cryptographic key to encrypt a challenge message. Rather than sending the first biometric instance to the candidate user mobile devices 408 at step S420, the access terminal 404 can send the encrypted challenge message. At step 422, each candidate user mobile device 408 can generate their own random string from their respective second biometric instances. Each candidate user mobile device 408 can attempt to decrypt the encrypted challenge message using their own random string as a cryptographic key. If the first biometric instance and second biometric instances match, the random strings should match, and consequently the encrypted challenge message should be decrypted correctly. The candidate user mobile devices 408 can each send their decrypted challenge message back to access terminal 404. The decrypted challenge messages may serve as a plurality of biometric match determination, indicating whether the first biometric instance matches the second biometric instance.

At step S426, the access terminal 404 can identify the mobile device of user 402 (i.e., user mobile device 410) based on a biometric match in the plurality of biometric match determinations. For example, the access terminal 404 can evaluate the decrypted challenge messages sent by candidate user mobile devices 408. The access terminal 404 can determine which challenge message, if any, were decrypted correctly. The candidate user mobile device 408 that was able to decrypt the challenge correctly has a matching biometric instance, and consequently is identified as the user mobile device 410 corresponding to user 402. The access terminal 404 can store the original challenge message in memory, and compare the received challenge messages to the original challenge messages in order to evaluate the biometric match determinations.

As an alternative, the access terminal 404 and candidate user mobile devices 408 can perform biometric matches using a secure multi-party computation protocol, such as garbled circuits. A garbled circuit is a Boolean circuit representation of a function, such as a function that outputs "TRUE" if the two input biometric instances match and outputs "FALSE" otherwise. However, in a garbled circuit, the inputs and output of each Boolean gate are encrypted, and rows of the corresponding truth table are shuffled or "garbled." Access terminal 404 can generate a garbled circuit that determines whether the first and second biometric instances match. At step S420, access terminal 404 can transmit the garbled circuit to candidate user mobile devices 408, as well as transmit the "garbled inputs" corresponding to the first biometric instance to candidate user mobile devices 408. As the candidate user mobile devices 408 are unable to decrypt the garbled inputs or determine them via the garbled circuit, the user's 402 first biometric instance is not exposed. Finally, using a process such as oblivious transfer, access terminal 404 can transmit the garbled inputs corresponding to each second biometric instance to the corresponding candidate user mobile device of the plurality of candidate user mobile devices 408.

At step S422, the candidate user mobile devices 408 can individually evaluate their received garbled circuits using the garbled input corresponding to the first biometric instance and the garbled input corresponding to the second biometric instance. The output of each garbled circuit is an encrypted biometric match determination.

At step S424, the plurality of candidate user mobile devices 408 can transmit the plurality biometric match determinations (garbled circuit outputs) to the access terminal 404.

At step S426, the access terminal 404 can identify the user mobile device 410 based on a biometric match in the plurality of biometric match determinations. These biometric match determinations can include both matches and non-matches. The access terminal 404, having generated the garbled circuit, is able to decrypt the encrypted biometric match determinations. The access terminal 404 can determine which of the biometric match determinations has a value of "TRUE" and determine the user mobile device 410 corresponds to the biometric match determination.

Steps S420-S426 can be accomplished in a number of different ways, and the preceding examples are intended to be non-limiting. In some embodiments, biometric matching between access terminal 404 and candidate user mobile devices 408 may use homomorphic encryption processes, such as Paillier encryption. Homomorphic encryption processes allow some mathematical operations to be carried out on encrypted values without first decrypting those values, e.g., it is possible to determine the encrypted sum of two encrypted values without first decrypting those values. A homomorphic cryptosystem, such as the Paillier cryptosystem can be used to compare the first and second biometric instance while the first and second biometric instances are encrypted. As a result, the access terminal 404 does not have to reveal the first biometric instance to the candidate user mobile devices 408 and the candidate user mobile devices 408 do not have to reveal the plurality of second biometric instances to the access terminal 404. Biometric comparison can be performed, for example, by representing the first biometric instance and the second biometric instance as vectors, then calculating the scalar product of the two vectors, while they are encrypted. The scalar product can be decrypted and compared to a threshold value, and based on the value of the scalar product relative to the threshold value, the biometric comparison can result in a match or a non-match.

At step S428, access terminal 404 can perform a further interaction with user mobile device 410. As an example, access terminal 404 can conduct a transaction, such as a payment transaction with user mobile device 410. A payment transaction of this type may be understood with reference to FIG. 7. Alternatively, access terminal 404 can conduct an interaction such as opening a door or granting access to a building. An interaction of this type may be understood with reference to FIG. 8. In some embodiments the further interaction may include obtaining, by access terminal 404, sensitive data from user mobile device 410. This sensitive data may include, for example, a payment account number or other payment credential that may be used to make a payment or authorize a transaction.

FIG. 5 shows a sequence diagram of a method of identifying a user 502 and a user mobile device 510, and conducting an interaction with a user mobile device 510 according to some embodiments of the invention. In FIG. 5, rather than receiving demographics information from mobile devices 506, the access terminal 504 may instead transmit demographics information to mobile devices 506. Each mobile device 506 may compare the received demographics information to demographics information stored on each of mobile devices 506. The mobile devices 506 may transmit demographics match determinations to the access terminal 504, and the access terminal 504 may determine a plurality of candidate user mobile devices 508 based on the demographics match determinations, then perform a biometric match with candidate user mobile devices 508 in order to identify user mobile device 510. Transmitting the demographics information to mobile devices 506 has an advantage because it preserves the privacy of the mobile device users, because their corresponding mobile devices do not automatically transmit demographics information to access terminal 504.

At step S512, access terminal 504 can receive messages from mobile devices 506. These messages can comprise any messages involved in establishing communication with access terminal 504. For example, access terminal 504 may receive a handshaking message from user mobile device 510 when user mobile device 510 enters into range of the access terminal 504 or an access network.

The messages may be received by access terminal 504 from mobile device 506 at any appropriate rate or any appropriate timeframe. The rate or timeframe can depend on the particular application of the access terminal 504 or interactions involving access terminal 506. The messages may comprise additional information used to enable further communication between the access terminal 504 and mobile devices 506. This may include information used to perform a telecommunication handshake, cryptographic keys used to establish a secure communication channel, indicators indicating that mobile devices 506 are enrolled in the biometric based hands-free interaction system, mobile device identifiers such as MSISDN, etc. Additionally, step S512 can involve access terminal 504 transmitting other messages to mobile devices 506. These other messages may include any of the information, cryptographic keys, indicators, and identifiers described above, as well as any other relevant information. In some embodiments, access terminal 506 and mobile devices 506 may perform a key exchange, such as a Diffie-Hellman key exchange in order for the access terminal to create secure communication channels for each mobile device.

Access terminal 504 may receive the information collected in the messages and use that information in order to perform later demographics matching or biometrics matching steps. For example, access terminal 504 may generate or populate a table or list comprising mobile identifiers and/or electronic addresses. An exemplary element in the list may be something like "demographics match determination: N/A, IP address: 100.192.0.000." The access terminal 504 may maintain this list for each mobile device in range of the access terminal. As a mobile device leaves range of the access terminal 504 or becomes unresponsive, the access terminal 504 may remove the corresponding entry from the list or table. Access terminal 504 may use the information received in the message in order to identify candidate user mobile devices 508 and user mobile device 510, as well as direct or route messages to mobile devices 506, candidate user mobile devices 508, and user mobile device 510. For example, when access terminal 504 receives demographics match determinations at a later step, access terminal 504 may populate the corresponding fields in the list, and use that information in order to determine candidate user mobile devices 508.

At step S514, access terminal 504 may capture a first biometric instance from user 502. The first biometric instance can comprise a fingerprint, palm print, palm veins, hand geometry, iris, retina, face, and/or a voice recording, among others. The access terminal 504 can capture the first biometric instance using any appropriate biometric interface or apparatus. For example, the access terminal 504 can comprise a retinal scanner comprising a low energy infrared light emitter and infrared light detector. The retinal scanner can cast a low energy beam of infrared light across the user's 502 eye and record the reflection off the retinal blood vessels and surrounding tissue as the first biometric instance. Alternatively, for a voice recording, the access terminal 504 may comprise a microphone that may be used to record a shot duration of user's 502 speech as the first biometric instance.

The first biometric instance may be generated by the access terminal 504 after some initial processing. For example, an image of an iris, captured by a high resolution camera connected to access terminal 504 may be converted into a first biometric instance comprising a 256 byte code, where each byte contains some information from the image of the iris (e.g., the color or brightness in a certain region of the iris image. As another example, a voice recording may be analyzed using signal processing techniques to determine frequency components, and the frequency components, along with other characteristics such as phonation, pitch, loudness, and rate, may be collected into a vector that is used as the first biometric instance.

At step S516, the access terminal 504 may infer demographics information (e.g., age, ethnicity, and biological sex) from the first biometrics instance. Inferring demographics information from the first biometrics instance can be accomplished in a number of ways. As one example, for a first biometric instance comprising a voice recording, the access terminal 504 can evaluate the pitch range of the voice recording. The access terminal 504 can determine the biological sex of the user by comparing the pitch range to the average pitch range of males and females. If the pitch range of the voice recording is more similar to a women's average pitch, the access terminal 404 can infer that the user 502 is female. Alternatively or additionally, as described above with reference to FIG. 4, the access terminal 504 can use machine learning models in order to infer user's 502 demographics information, such as a machine learning classifier.

At step S518, the access terminal 504 can transmit the demographics information to mobile devices 506, either directly or via an access network. The demographics information may be transmitted to mobile devices 506 in encrypted or unencrypted form.

At step S520, mobile devices 506 analyze the demographics information received form the access terminal 504 and first demographics information stored on the mobile devices 506. For example, the first and second demographics information may be represented by ordered sets, such as "male, black hair, age: 20-30." Each mobile device 506 may analyze the demographics information by comparing it to demographics information stored on the mobile device and looking for exact matches, i.e., when all elements of the sets of demographics information are identical. Alternatively, the mobile devices 506 may be more flexible with some demographics information than other demographics information. A mobile device 506 may consider the demographics information "male, black hair, age: 25-30" to match the example given above, because both biological sex and ethnicity match, and the age range generally overlaps.

In the above example, demographics information was represented as ordered sets, however, demographics information may take other forms, for example, demographics information may be represented as a series of binary values or an alphanumeric sequence, as described above with reference to FIG. 4. The series of binary values or alphanumeric sequences corresponding to the first demographics information and the second demographics information may be compared using a distance metric, such as Hamming distance, or by performing vector operations, such as the scalar product. Distance metrics or the results of vector operations may be compared to predetermined distance thresholds in order to verify if the demographics information matches, as described above with reference to FIG. 4.

At step S522, each mobile device 506 may generate a demographics match determination based on the analysis of the demographics information received by access terminal 504 and mobile devices 506. The demographics match determination may comprise a simple electronic message, indicator or statement indicating whether the demographics information matches, such as a Boolean value TRUE or FALSE. In some embodiments, the biometric match determinations may also include the magnitude of the distance metric or other metadata, the comparison threshold, or a confidence interval. This enables the access terminal 504 to verify the results produced by mobile devices 506. The demographics match determinations may be encrypted, in order to prevent eavesdroppers from determining which devices have stored matching demographics information.

At step S524, mobile devices 506 can transmit the plurality of biometric match determinations to access terminal 504.

At step S526, the access terminal 504 can determine a plurality of candidate user mobile devices 508 from mobile devices 506 based on the plurality of biometric match determinations. In some embodiments, the access terminal 504 may simply select all mobile devices 504 with positive biometric match determinations. In other embodiments, the access terminal 504 may check or verify the biometric match determinations, using a stated magnitude, confidence interval or comparison threshold included in the in the biometric match determinations. The access terminal 504 may only select candidate user mobile devices that return a positive match and a high confidence interval (e.g., over 90% confidence).

At step S528-S532, the access terminal 504 can perform a biometrics matching process with the plurality of candidate user mobile devices 508. This may involve transmitting the first biometric instance (i.e., the biometric instance captured from user 502 at step S514) to candidate user mobile devices 518. The plurality of candidate user mobile devices 508 may compare the first biometric instance to second biometric instances stored on the plurality of candidate user mobile devices 508. As with FIG. 4, it should be understood that in some embodiments, the access terminal 504 may not transmit the first biometric instance to the candidate user mobile devices 508 in order to preserve the privacy of user 502. Instead, the access terminal 504 and candidate user mobile devices 508 may perform a biometric matching process that does not involve the access terminal 504 transmitting the first biometric instance to candidate user mobile devices 508. As examples, access terminal 504 and candidate user mobile devices 508 may perform a secure multi-party computation, such as a garbled circuit protocol, in order to compare the first biometric instance to the plurality of second biometric instances stored on candidate user mobile devices 508. Alternatively, the access terminal 504 and candidate user mobile devices 508 may use fuzzy extraction in order to verify the biometric instances match, without exposing the biometric instances. As another alternative, by using a homomorphic encryption process, the access terminal 506 and candidate user mobile devices 508 may compute a distance metric, such as the scalar product of two vectors representing the first biometric instance and the second biometric instance, while the biometric instances are encrypted.

At step S532, the access terminal can receive the plurality of biometric match determinations from mobile devices 506. Biometric match determinations can indicate non-matches as well as matches. Subsequently, at step S534, the access terminal can identify the user mobile device 510 based on a biometric match in the plurality of biometric match determinations. As one example, the access terminal 504 can iterate through the plurality of biometric match determinations until it identifies a match among the biometric match determinations. The access terminal 504 can determine the candidate user mobile device 508 that transmitted the positive biometric match determination, and identify that candidate user mobile device as the user mobile device 510 corresponding to user 502.

At step S536, access terminal 504 can perform a further interaction with user mobile device 510. As an example, access terminal 504 can conduct a transaction, such as a payment transaction with user mobile device 510, as described below with reference to FIG. 7. Alternatively, access terminal 504 can perform an interaction such as granting access to a building, as described below with reference to FIG. 8. In some embodiments, the further interaction may include obtaining by access terminal 504, sensitive data from the user mobile device 510, such as a payment account number or other payment credential.

Figure 6:
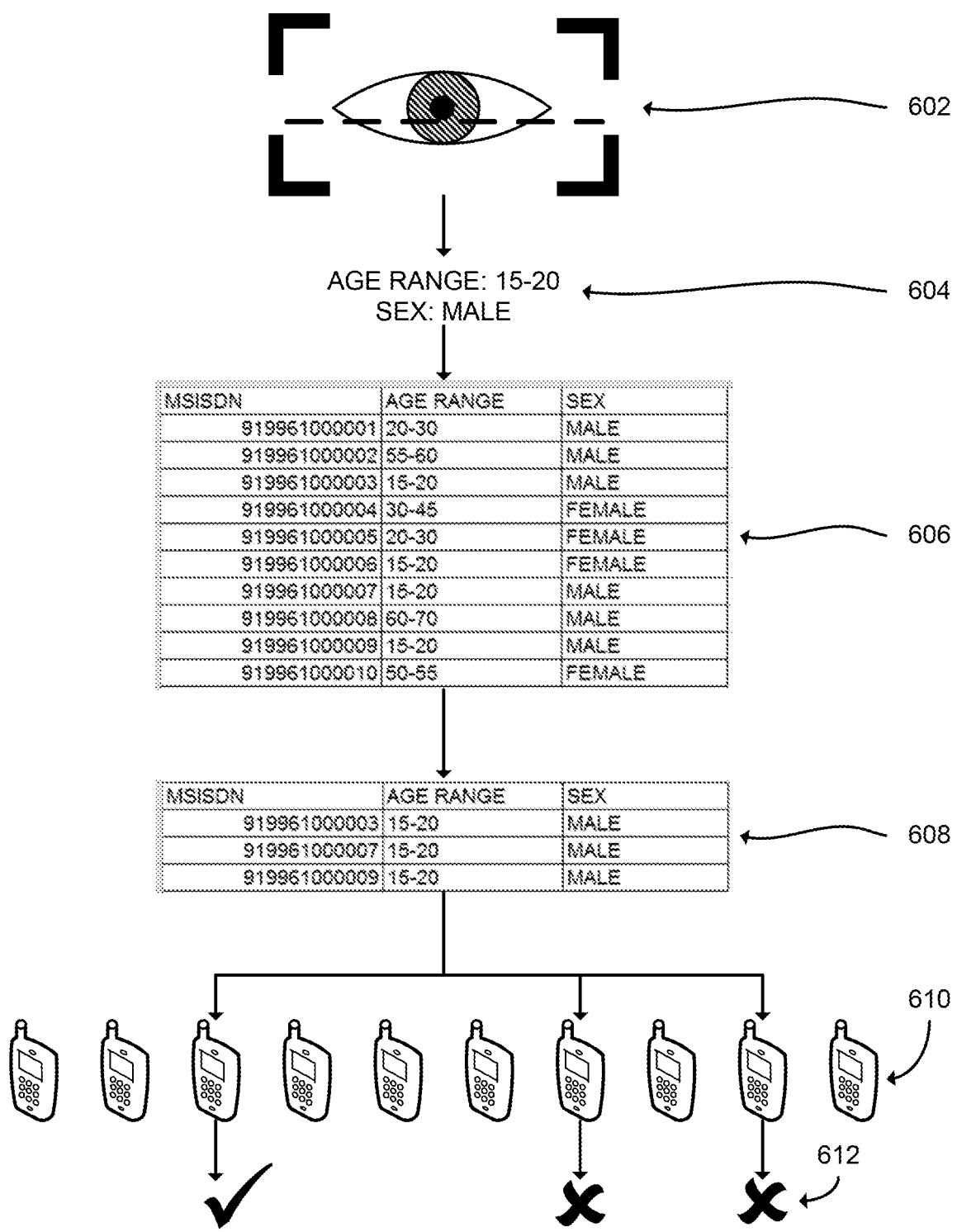
FIG. 6 shows an exemplary sequence of operations performed by an access terminal according to some embodiments of the invention.

FIG. 6 shows a diagram of an exemplary demographics filtering process using demographics tables according to some embodiments of the invention.

In an exemplary use case, a biometrics based hands-free interaction system may be used to handle checkout in a store. A 20 year old male customer, enrolled in a biometric based, hands-free checkout program enters the store. Upon entering, the customer's mobile device wirelessly communicates with an access terminal located within the store. The mobile device may communicate with the access terminal via an access network, which can comprise networks such as the Internet, a Local Area Network, or a Bluetooth, BLE, or Zigbee network supported by an array of antennas or beacons located throughout the store, or any other appropriate network. The mobile device can retrieve the user's demographics information from memory and provide the user's demographic information to the access terminal along with a mobile device identifier, such as an MSISDN. The access terminal can maintain a table or list of demographics information and mobile device identifiers (e.g., table 606). This can include the demographics information and corresponding mobile device identifiers of all mobile devices in the store or in proximity to the access terminal (e.g., within 20 feet). The table shows 6 male customers and 4 female customers with a variety of age ranges.

Upon completing their shopping, the 20 year old male customer approaches the checkout line and the access terminal. The access terminal may be capable of capturing biometric instances such as an iris scan. The customer can approach the access terminal and follow any prompts or instructions (e.g., instructing the user to place his right or left eye up to the scanner and press a button to start the biometric scan), the access terminal can capture a biometric instance of the user, indicated by 602.

The access terminal can then determine the customer's demographic information (i.e., male, 15-20 years old) from the captured biometric instance. While the iris is generally stable over time, aspects of the eye change as a person ages, and evidence of these changes in the iris scan can be used to infer the age of the user along with other demographic information. For example, Pupil dilation decreases with age, which can result in an increase in the relative size of the iris on an iris scan, thus the age can be inferred from an iris scan. Similarly the biological sex and ethnicity of the customer can be inferred from the iris scan. 604 shows the user's demographics information, including an age range (15-20) and a biological sex (male).

The access terminal can use the determined demographics information to search, query, or otherwise filter the demographics information table 606 for matches. Based on the demographics information inferred at 604, the access terminal can produce a table of matching demographics information and mobile device identifiers, shown by table 608. These candidate user mobile devices correspond to mobile devices with demographics information that matches the customer.

The access terminal can then perform a biometric matching procedure with the candidate user mobile devices, shown as the third, seventh, and ninth mobile devices in the row of mobile devices at 610. This biometric matching procedure can be accomplished via secure multi-party computation, homomorphic encryption, fuzzy extraction, or any other appropriate method of biometric matching, as described above.

The access terminal can receive biometric match determinations 612 from the candidate user mobile devices. Two candidate user mobile devices produced non-matching biometric match determinations, while one candidate user mobile device produced a matching biometric match determination. The candidate user mobile device with matching biometric match determination can be the user mobile device used by the customer. As such, the access terminal can perform a further interaction with the user mobile device, such as a payment transaction in order to pay for the goods the customer intends to purchase.

Figure 7:
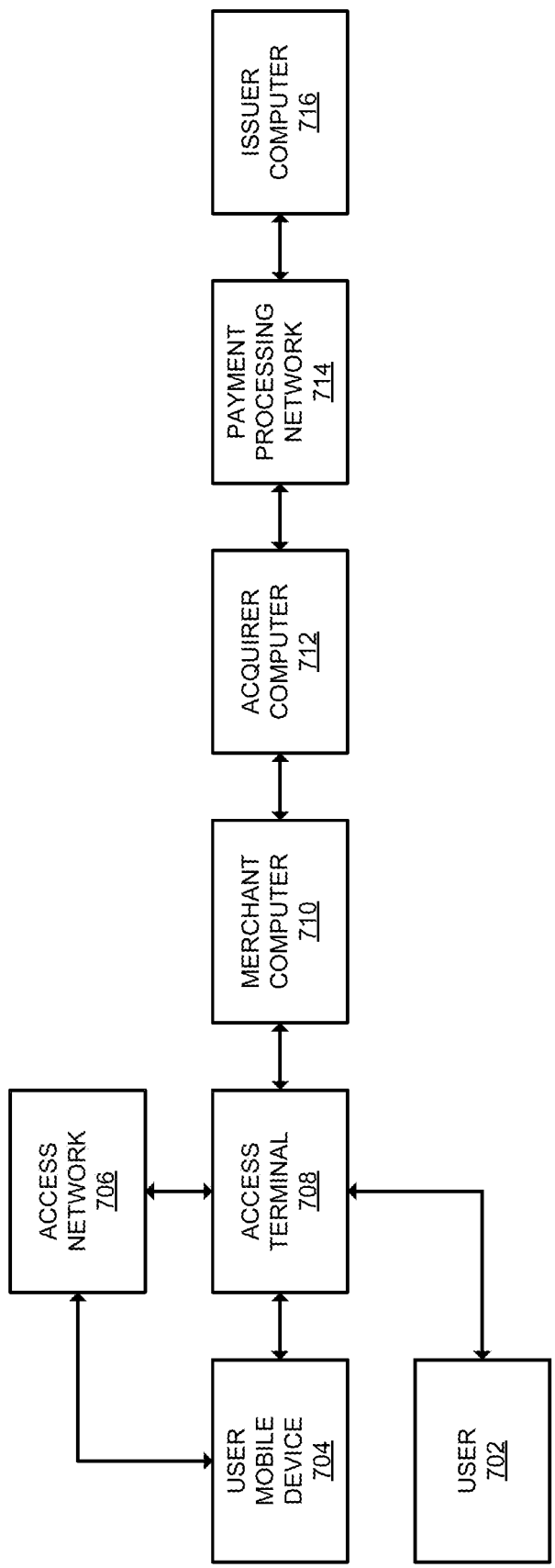
FIG. 7 shows a system block diagram of an interaction processing system according to some embodiments of the invention

FIG. 7 shows a block diagram of a transaction processing system that can be used with biometric based hands-free interactions. FIG. 7 shows a user 702 that can operate a user mobile device 704. The user 702 may use the user mobile device 704 to pay for a good or service at a merchant. The merchant may operate a merchant computer 710 and/or an access terminal 708. Additionally, the access terminal 708 may interface with an access network 706 in order to communicate with user mobile device 704. The merchant may communicate with an issuer computer 716 via an acquirer computer 712 and a payment processing network 714.

The payment processing network 714 may include data processing subsystems, networks, and operations used to support and deliver authorization services, exception file services, and clearing and settlement services. An exemplary payment processing network 714 may include VisaNet™. Payment processing networks such as VisaNet™ are able to process credit card transactions, debit cards transaction, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using biometric based hands-free interactions at an access terminal 708 (e.g., a POS location) can be described as follows. A user 702 has a first biometric instance captured by access terminal 708 (e.g., access terminal 708 includes a camera that scans user's 702 iris). Access terminal 708 infers demographics information from the first biometric instance, and performs demographics filtration, identifying user mobile device 704 as a candidate user mobile device. Access terminal 708 and user mobile device 704 perform a biometric matching process using the first biometric instance and a second biometric instance stored on user mobile device 704. Access terminal 708 receives a biometric match determination from user mobile device 704 and evaluates the biometric match determination. If the biometric match determination is a match (i.e., the first biometric instance matches a second biometric instance stored on user mobile device 704), the user mobile device 704 and access terminal 708 interact such that one or more access credentials from user mobile device 704 (e.g., PAN, a payment token, verification value (s), expiration date, etc.) are received by the access terminal 708 (e.g., via access network 706). The merchant computer 710 may then generate an authorization request message that includes the information received form the access terminal 708 (i.e., information corresponding to the mobile device 210) along with additional transaction information (e.g., a transaction amount, merchant specific information, etc.) and electronically transmits this information to an acquirer computer 712. The acquirer computer 712 may then receive, process, and forward the authorization request message to the issuer computer 716 via the payment processing network 714 for authorization. The issuer computer 716 may reply with an authorization response message. The authorization response message may be transmitted from the issuer computer 716 to the access terminal 708 via the merchant computer 710, the acquirer computer 712, and the payment processing network 714.

At the end of the day or at some other suitable time interval, a clearing and settlement process between the acquirer computer 712, the payment processing network 714, and the issuer computer 716 may be performed on the transaction.

Figure 8:
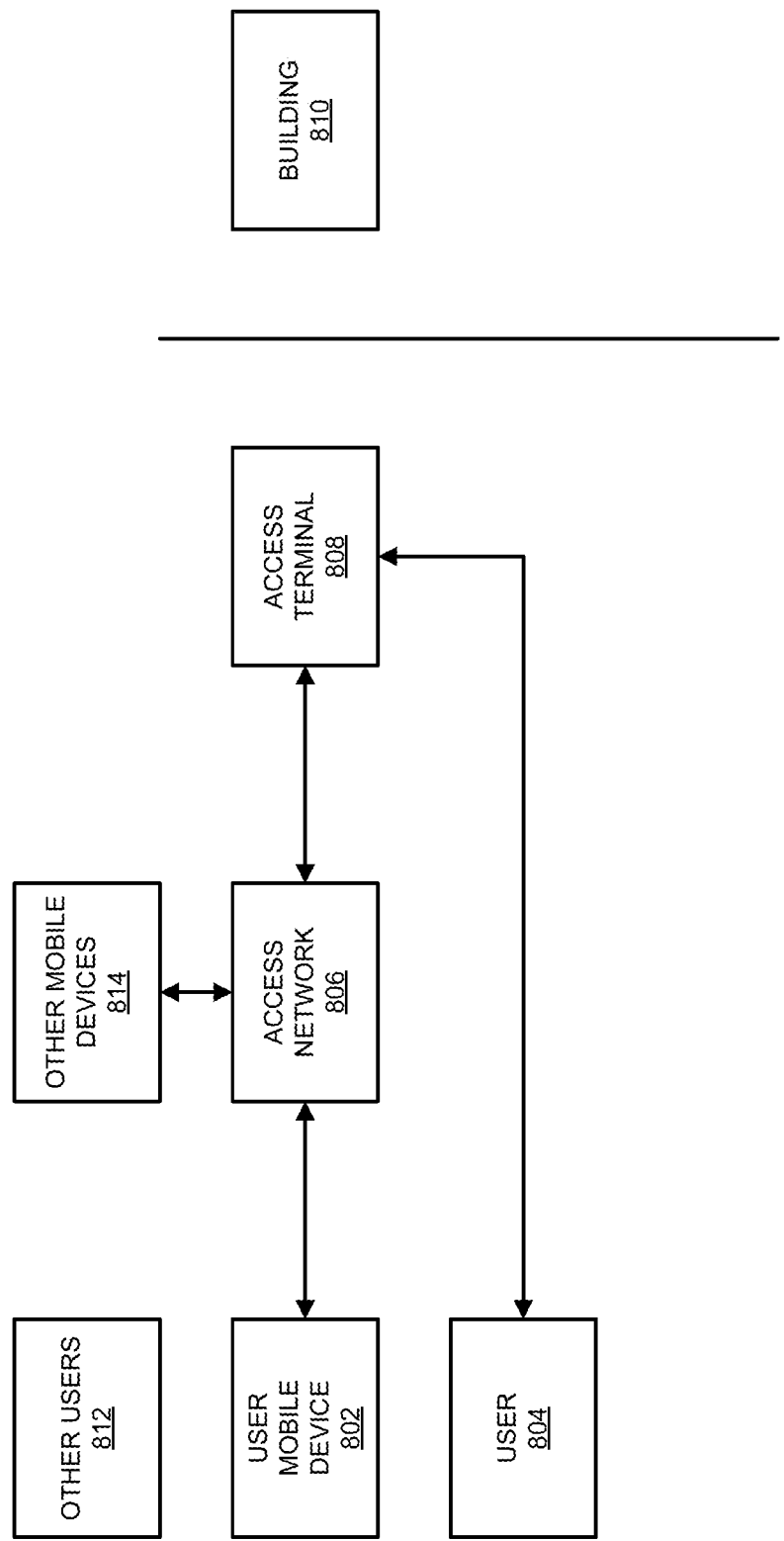
FIG. 8 shows a block diagram of an interaction processing system according to some embodiments of the invention.

FIG. 8 shows a block diagram of a building access system that may be implemented using some embodiments of the invention. FIG. 8 shows a user mobile device 802 operated by user 804. The user mobile device 802 can communicate with an access terminal 808 via an access network 806. Access terminal 808 may be used to control access to building 810, e.g., the access terminal 808 may engage or disengage an electronic lock in order to lock or unlock a door to the building. Additionally, there may be other users 812 present in the vicinity of building 110 and access terminal 808. Other users 812 may operate a collection of other mobile devices 814, which may also communicate with access network 806.

As an exemplary use case, building 810 may be an apartment complex located on a busy street. Building 810 may require a biometric match in order to enter. User 804 may be a resident of building 810, and may approach the access terminal 808 as part of entering building 810. As user 804 approaches access terminal 808, the user mobile device 802 may automatically begin communicating with access terminal 808 via access network 806. User mobile device 802 may transmit demographics information corresponding to user 804 to the access terminal, such as user's 804 age, sex, or ethnicity. Access terminal 808 may store this information, along with any demographics information received from other mobile devices 814 corresponding to other users 812.

Access terminal 808 may capture a biometric instance corresponding to user 804, e.g., user 804 may position themselves such that their face or one of their eyes is visible to a camera attached to access terminal 808. Access terminal 808 may use the camera to scan user's 804 eye and produce a first biometric instance comprising an iris scan. Access terminal 808 may infer demographic information from the first biometric instance, such as the age, biological sex, or ethnicity of user 804.

Access terminal 808 may compare the inferred demographics information to the demographics information received from user mobile device 802 and other mobile devices 814, in order to determine candidate user mobile devices that have a demographics match. The access terminal 808 may determine that the user mobile device 802 has a demographics match, and may initiate a biometrics matching procedure in order to verify the biometric instance captured by access terminal 808.

The access terminal 808 can communicate with user mobile device 802 to perform the biometric matching procedure via the access network 806. In some embodiments, the biometric matching process may involve performing a secure multi-party computation, such as a garbled circuit used to compare two biometric instances. The access terminal 808 may generate and transmit a garbled circuit to user mobile device 802, and additionally transmit garbled inputs corresponding to the biometric instance stored on user mobile device 802 using oblivious transfer. The user mobile device 802 may evaluate the garbled circuit using the received inputs in order to produce a biometric match determination. The user mobile device 802 may transmit the biometric match determination (indicating a biometric match) to access terminal 808.

Access terminal 808 may evaluate the received biometric match determination to determine if the biometric instance captured from user 804 matches the biometric instance stored on user mobile device 802. If the biometric instances match, the access terminal 808 may open the door and allow user 804 to enter building 810.

Further details and descriptions of biometric processing can be found in the following documents, which are herein incorporated by reference in their entirety for all purposes: PCT application number PCT/US17/24099, entitled AUTHENTICATION SYSTEM USING SECURE MULTI-PARTY COMPUTATION, filed on Mar. 24, 2017. PCT application number PCT/US16/58880, entitled WIRELESS BIOMETRIC AUTHENTICATION SYSTEM AND METHOD, filed on Oct. 26, 2016. Han, H., Otto, C., Liu, X., & Jain, A. K. (2015). Demographic estimation from face images: Human vs. machine performance. IEEE transactions on pattern analysis and machine intelligence, 37(6), 1148-1161. Wang, X., Guo, R., & Kambhamettu, C. (2015, January). Deeply-learned feature for age estimation. In Applications of Computer Vision (WACV), 2015 IEEE Winter Conference on (pp. 534-541). IEEE. Lagree, S., & Bowyer, K. W. (2011, November). Predicting ethnicity and gender from iris texture. In Technologies for Homeland Security (HST), 2011 IEEE International Conference on (pp. 440-445). IEEE. Thomas, V., Chawla, N. V., Bowyer, K. W., & Flynn, P. J. (2007, September). Learning to predict gender from iris images. In Biometrics: Theory, Applications, and Systems, 2007. BTAS 2007. First IEEE International Conference on (pp. 1-5). IEEE.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the same components or subsystems, e.g., connected together by an external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can include computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may include specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving messages, by an access terminal, from a group of mobile devices operated by a group of users;
capturing, by the access terminal, a first biometrics instance from a user of a mobile device within the group of users;
inferring, by the access terminal from the first biometrics instance, demographics information;
determining, by the access terminal, a plurality of candidate user mobile devices from the group of mobile devices using the demographics information;
receiving, from the plurality of candidate user mobile devices, a plurality of biometric match determinations, wherein the plurality of biometric match determinations are based on a comparison of the first biometrics instance with second biometrics instances stored on the candidate user mobile devices;

identifying the mobile device of the user based on a biometric match in the plurality of biometric match determinations; and performing, by the access terminal, a further interaction with the mobile device, wherein the messages comprise a group of first demographics information corresponding to the group of users, and wherein the demographics information is second demographics information, and wherein determining the plurality of candidate user mobile devices from the group of mobile devices using the demographics information is performed by comparing the second demographics information to each of a first demographics information in the group of first demographics information.

2. The method of claim 1, wherein the first biometric instance includes one or more of fingerprint, palm print, palm veins, hand geometry, iris, retina, face, and/or voice.

3. The method of claim 1, wherein the demographics information includes one or more of age, biological sex, and/or ethnicity.

4. The method of claim 1, further comprising:
transmitting, to the plurality of candidate user mobile devices, the first biometrics instance or a derivative thereof.

5. The method of claim 1, wherein the further interaction includes obtaining, by the access terminal, sensitive data from the mobile device.

6. The method of claim 1, wherein the group of mobile devices uses homomorphic encryption, secure multi-party computation, and/or fuzzy extraction processes to perform the biometric match determinations.

7. A method comprising:
receiving messages, by an access terminal, from a group of mobile devices operated by a group of users;
capturing, by the access terminal, a first biometrics instance from a user of a mobile device within the group of users;
inferring, by the access terminal from the first biometrics instance, demographics information;
determining, by the access terminal, a plurality of candidate user mobile devices from the group of mobile devices using the demographics information;
receiving, from the plurality of candidate user mobile devices, a plurality of biometric match determinations, wherein the plurality of biometric match determinations are based on a comparison of the first biometrics instance with second biometrics instances stored on the candidate user mobile devices;
identifying the mobile device of the user based on a biometric match in the plurality of biometric match determinations; and
performing, by the access terminal, a further interaction with the mobile device, wherein determining, by the access terminal, the plurality of candidate user mobile devices from the group of mobile devices using the demographics information is performed by transmitting, by the access terminal, to the group of mobile devices, the demographics information, and receiving, by the access terminal, from the group of mobile devices, demographics match determinations, and determining, by the access terminal, the plurality of candidate user mobile devices using matches in the demographics match determinations.

8. The method of claim 7, wherein the access terminal is a point-of-sale terminal, and wherein the further interaction is a payment transaction.

9. The method of claim 7, wherein the group of mobile devices uses homomorphic encryption, secure multi-party computation, and/or fuzzy extraction processes to perform the plurality of biometric match determinations.

10. An access terminal comprising:
a processor; and
a non-transitory computer readable medium coupled to the processor, the non-transitory computer readable medium comprising code, executable by the processor for performing a method comprising:
receiving messages from a group of mobile devices operated by a group of users;
capturing a first biometrics instance from a user of a mobile device within the group of users;
inferring from the first biometrics instance, demographics information;
determining a plurality of candidate user mobile devices from the group of mobile devices using the demographics information;
receiving, from the plurality of candidate user mobile devices, a plurality of biometric match determinations, wherein the plurality of biometric match determinations are based on a comparison of the first biometric instance with second biometric instances stored on the candidate user mobile devices;
identifying the mobile device of the user based on a biometric match in the plurality of biometric match determinations; and
performing a further interaction with the mobile device,
wherein determining the plurality of candidate user mobile devices from the group of mobile devices using demographics information is performed by transmitting demographics information to the group of mobile devices and receiving demographics match determinations from the group of mobile devices and determining the plurality of candidate user mobile devices using matches in the demographics match determinations.

11. The access terminal of claim 10, wherein the first biometrics instance includes one or more of fingerprint, palm print, palm veins, hand geometry, iris, retina, face, and/or voice.

12. The access terminal of claim 10, wherein demographics information includes one or more of age, biological sex, and/or ethnicity.

13. The access terminal of claim 10, wherein the method further comprises:
transmitting, to the plurality of candidate user mobile devices, the first biometrics instance or a derivative thereof.

14. The access terminal of claim 10, wherein the further interaction includes obtaining sensitive data from the mobile device.

15. The access terminal of claim 10, wherein the group of mobile devices uses homomorphic encryption, secure multi-party computation, or fuzzy extraction processes to perform the biometric match determinations.

16. An access terminal comprising:
a processor; and
a non-transitory computer readable medium coupled to the processor, the non-transitory computer readable medium comprising code, executable by the processor for performing a method comprising:
receiving messages from a group of mobile devices operated by a group of users;

capturing a first biometrics instance from a user of a mobile device within the group of users:

inferring from the first biometrics instance, demographics information;

determining a plurality of candidate user mobile devices from the group of mobile devices using the demographics information;

receiving, from the plurality of candidate user mobile devices, a plurality of biometric match determinations, wherein the plurality of biometric match determinations are based on a comparison of the first biometric instance with second biometric instances stored on the candidate user mobile devices;

identifying the mobile device of the user based on a biometric match in the plurality of biometric match determinations; and performing a further interaction with the mobile device, wherein the messages comprise a group of first demographics information corresponding to the group of users, and wherein the demographics information is second demographics information, and wherein determining the plurality of candidate user mobile devices using the demographics information is performed by comparing the second demographics information to each of a first demographics information in the group of first demographics information.

17. The access terminal of claim 16, wherein the access terminal is a point-of-sale terminal, and wherein the further interaction is a payment transaction.

18. The access terminal of claim 16, wherein the group of mobile devices uses homomorphic encryption.

19. A method comprising:

transmitting, by a mobile device to an access terminal, a message, wherein the access terminal thereafter captures a first biometrics instance from a user of the mobile device, infers demographics information from the first biometrics instance, determines a plurality of candidate user mobile devices from a group of mobile devices using the demographics information;

generating a match determination based on a comparison of the first biometrics instance with a second biometrics instance stored on the mobile device; and transmitting, by the mobile device, the match determination to the access terminal, wherein the access terminal identifies the mobile device of the user based on a biometric match in the match determination and performs a further interaction with the mobile device, wherein the message comprises first demographics information corresponding of the user of the mobile device, and wherein the demographics information is second demographics information, and wherein the access terminal receives other first demographics information from a plurality of other mobile devices, wherein a group of first demographics information comprises the first demographics information and the other first demographics information, wherein the access terminal determines the plurality of candidate user mobile devices from the group of mobile devices using the demographics information by comparing the second demographics information to each of a first demographic information in the group of first demographic information.

20. The method of claim 19, wherein the access terminal is a point-of-sale terminal, and wherein the further interaction is a payment transaction.

21. The method of claim 19, wherein the mobile device uses homomorphic encryption, secure multi-party computation, and/or a fuzzy extraction process to perform the match determination.

22. A method comprising:

transmitting, by a mobile device to an access terminal, a message, wherein the access terminal thereafter captures a first biometrics instance from a user of the mobile device, infers demographics information from the first biometrics instance, determines a plurality of candidate user mobile devices from a group of mobile devices using the demographics information;

generating a match determination based on a comparison of the first biometrics instance with a second biometrics instance stored on the mobile device; and transmitting, by the mobile device, the match determination to the access terminal, wherein the access terminal identifies the mobile device of the user based on a biometric match in the match determination and performs a further interaction with the mobile device, wherein determining the plurality of candidate user mobile devices from the group of mobile devices using demographics information is performed by transmitting the demographics information to the group of mobile devices, and wherein the method further comprises:

receiving, by the mobile device, the demographics information from the access terminal;

analyzing, by the mobile device, the demographics information and first demographics information stored on the mobile device;

generating, by the mobile device, a demographics match determination; and transmitting, by the mobile device, the demographics match determination to the access terminal, wherein the access terminal receives a plurality of other demographics match determinations, wherein a group of demographics match determinations comprises the demographics match determinations and the plurality of other demographics match determinations, and wherein the access terminal determines the plurality of candidate user mobile devices using matches in the group of demographic match determinations.

23. The method of claim 22, wherein the access terminal is a point-of-sale terminal, and wherein the further interaction is a payment transaction.

24. The method of claim 22, wherein the mobile device uses homomorphic encryption, secure multi-party computation, and/or a fuzzy extraction process to perform the match determination.

* * * * *